US012582037B2

(12) United States Patent
Franke et al.

(10) Patent No.: US 12,582,037 B2
(45) Date of Patent: Mar. 24, 2026

(54) DRAPER DRUM FLOOR VANES

(71) Applicant: DEERE & COMPANY, Moline, IL (US)

(72) Inventors: Derek J. Franke, Monroeville, IN (US); Michael T. Meschke, Eldridge, IA (US); Nicholas J. Keener, Geneseo, IL (US)

(73) Assignee: Deere & Company, Moline, IL (US)

( * ) Notice: Subject to any disclaimer, the term of this patent is extended or adjusted under 35 U.S.C. 154(b) by 714 days.

(21) Appl. No.: 17/977,653

(22) Filed: Oct. 31, 2022

(65) Prior Publication Data

US 2024/0138295 A1 May 2, 2024

(51) Int. Cl.
*A01D 41/127* (2006.01)

(52) U.S. Cl.
CPC .................................. *A01D 41/127* (2013.01)

(58) Field of Classification Search
CPC ...................................................... A01D 41/127
See application file for complete search history.

(56) References Cited

U.S. PATENT DOCUMENTS 4,875,889 A * 10/1989 Hagerer ............... A01D 75/282
                                                      56/DIG. 15
6,241,605 B1 6/2001 Pfeiffer et al.

| | | | |
|---|---|---|---|
| 7,827,775 B2 | 11/2010 | Sethi | |
| 10,806,081 B2 | 10/2020 | Eyestone et al. | |
| 2010/0043371 A1* | 2/2010 | Rieck ................... | A01D 45/025 |
| | | | 56/14.7 |
| 2013/0005238 A1* | 1/2013 | Brandt .................... | F24F 13/14 |
| | | | 454/275 |
| 2016/0330907 A1* | 11/2016 | Anderson .......... | A01D 41/1271 |
| 2017/0311547 A1* | 11/2017 | Fuchs ................... | A01F 12/446 |
| 2018/0168100 A1* | 6/2018 | Ueda ...................... | A01D 41/12 |
| 2020/0163277 A1* | 5/2020 | Cooksey .............. | A01D 41/127 |

* cited by examiner

*Primary Examiner* — Claude J Brown
(74) *Attorney, Agent, or Firm* — Taft Stettinius & Hollister LLP; Stephen F. Rost

(57) ABSTRACT

An adjustable divider system that is adapted to assist in distributing a crop material being discharged from a draper header to a feederhouse. The adjustable divider system can include a plurality of dividers positioned adjacent to an upper side of a drum floor and at least one actuator coupled to the plurality of dividers. A controller can be coupled to the at least one actuator and adapted to selectively operate the at least one actuator. Additionally, at least one sensor can be adapted to provide information to the controller indicative of a distribution of the crop material that can be used by the controller in connection with generating a signal to selectively operate the at least one actuator. Further, one or more of the plurality of dividers can be pivotally displaceable about the drum floor in response to the selective operation of the at least one actuator.

18 Claims, 17 Drawing Sheets

DRAPER DRUM FLOOR VANES

FIELD OF THE DISCLOSURE

The present disclosure generally relates to a draper header utilized with an agricultural machine, and, more specifically, to a draper header adapted to improve the balance of crop material being delivered from the draper header to a feederhouse.

BACKGROUND

Agricultural draper headers are used with agricultural harvesters, such as combines, to harvest a crop. Moreover, draper headers are used to transport crop material cut by a cutter bar of the header laterally inwardly and rearwardly to a feederhouse of the harvester for processing by the harvester. The crop material can include crop, such as, for example, wheat, that is to be harvested and crop residue, such as, for example straw and/or leaves, among other materials. With respect to at least certain harvesters, severed harvested crop is cross conveyed by a cross-feeding auger or outer conveyor belts of the draper header to a central region of the draper header, where the cut crop material can be conveyed rearward by a central conveyor belt to a discharge opening of the draper header. A conveying drum provided with fingers can be arranged above the discharge opening and utilized in directing, such as, for example, throwing the cut crop material into the feederhouse where the crop material can be cleaned, such as, for example, via a separation of the crop from the crop residue.

The capacity of the harvester, such as, for example, the amount crop material the harvester cleans and/or the efficiency in cleaning the crop material, can be adversely impacted by an unbalanced distribution of the crop material that is entering into the feederhouse. For example, in instances in which the harvester is traveling on a side hill such that the draper header is not level and/or is at an inclined/declined orientation, crop material traveling toward the central region may be predominately pulled to either the left or right side of the central region of the draper header and/or the central conveyor belt. As a consequence, more crop material may pass through either one of the left or right sides of the discharge opening and into the feederhouse. Alternatively, in some instances, the draper header of the harvester can encounter more, or a heavier density of, crop on one side of the draper header than the other. As a result, an imbalance can occur in which a relatively larger quantity of crop material is delivered to one side of the discharge opening, and, thus, an unbalanced distribution of crop material is fed into the feederhouse. Such an imbalance in crop material in the feederhouse, such as, for example, along at least a width of a cleaner chute of the feederhouse, can adversely impact the capacity of the harvester at least with respect to cleaning the crop material.

SUMMARY

The present disclosure may include one or more of the following features and combinations thereof.

In one embodiment of the present disclosure, an adjustable divider system is adapted to assist in distributing a crop material being discharged from a draper header to a feederhouse. The adjustable divider system can include a plurality of dividers positioned adjacent to an upper side of a drum floor and at least one actuator coupled to the plurality of dividers. A controller can be coupled to the at least one actuator and adapted to selectively operate the at least one actuator. Additionally, at least one sensor can be adapted to provide information to the controller indicative of a distribution of the crop material that can be used by the controller in connection with generating a signal to selectively operate the at least one actuator. Further, one or more of the plurality of dividers can be pivotally displaceable about the drum floor in response to the selective operation of the at least one actuator.

In another embodiment, a method is provided for operating an adjustable divider system to assist in distributing a crop material. The method can include detecting, by one or more sensors of an agricultural machine, one or more distribution characteristics of the crop material and determining, using the one or more distribution characteristics, a crop material distribution at one or more locations along at least a portion the agricultural machine. In response to the determined crop material distribution, one or more dividers can be pivotally displaced relative to a drum floor of the header to adjust a distribution of the crop material entering into a feederhouse of the agricultural machine.

These and other features of the present disclosure will become more apparent from the following description of the illustrative embodiments.

BRIEF DESCRIPTION OF THE DRAWINGS

The present disclosure is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

Corresponding reference numerals are used to indicate corresponding parts throughout the several views.

DETAILED DESCRIPTION

Figure 1:
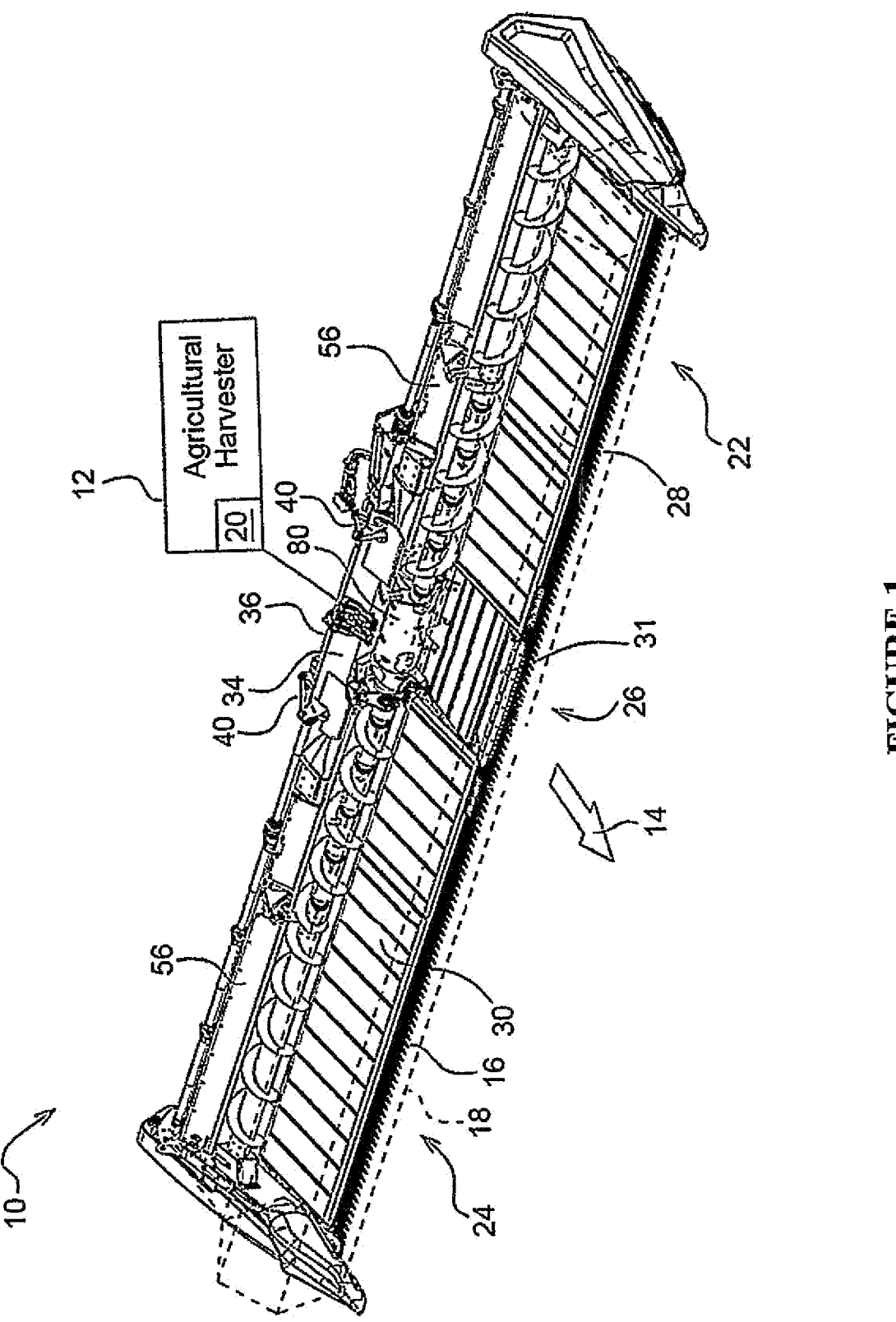
FIG. 1 illustrates a perspective view of an exemplary agricultural header having two side draper belts, and a center draper belt positioned laterally between the side draper belts.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

Figure 2:
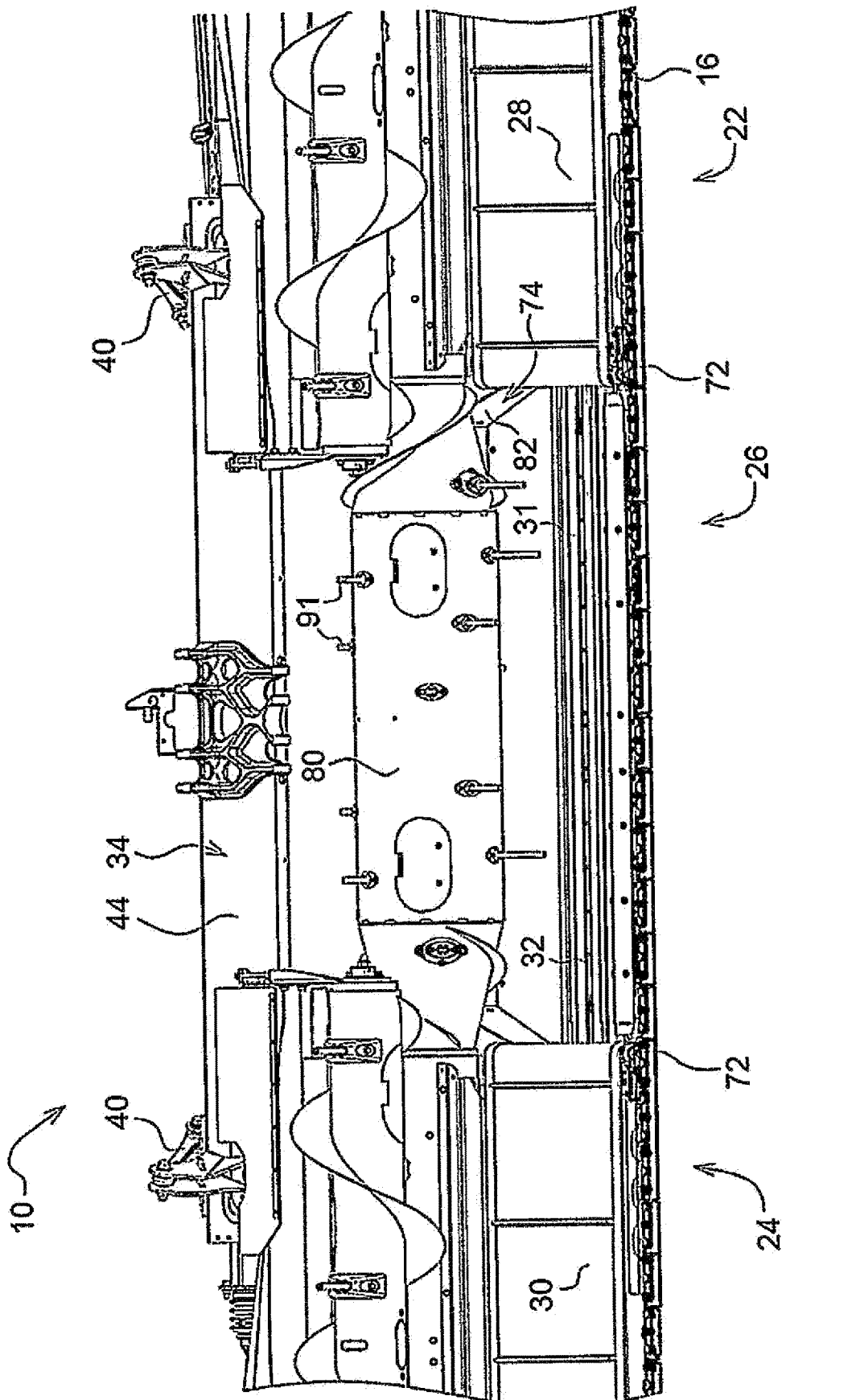
FIG. 2 illustrates a front elevation view of a middle area of the agricultural header.
Figure 3:
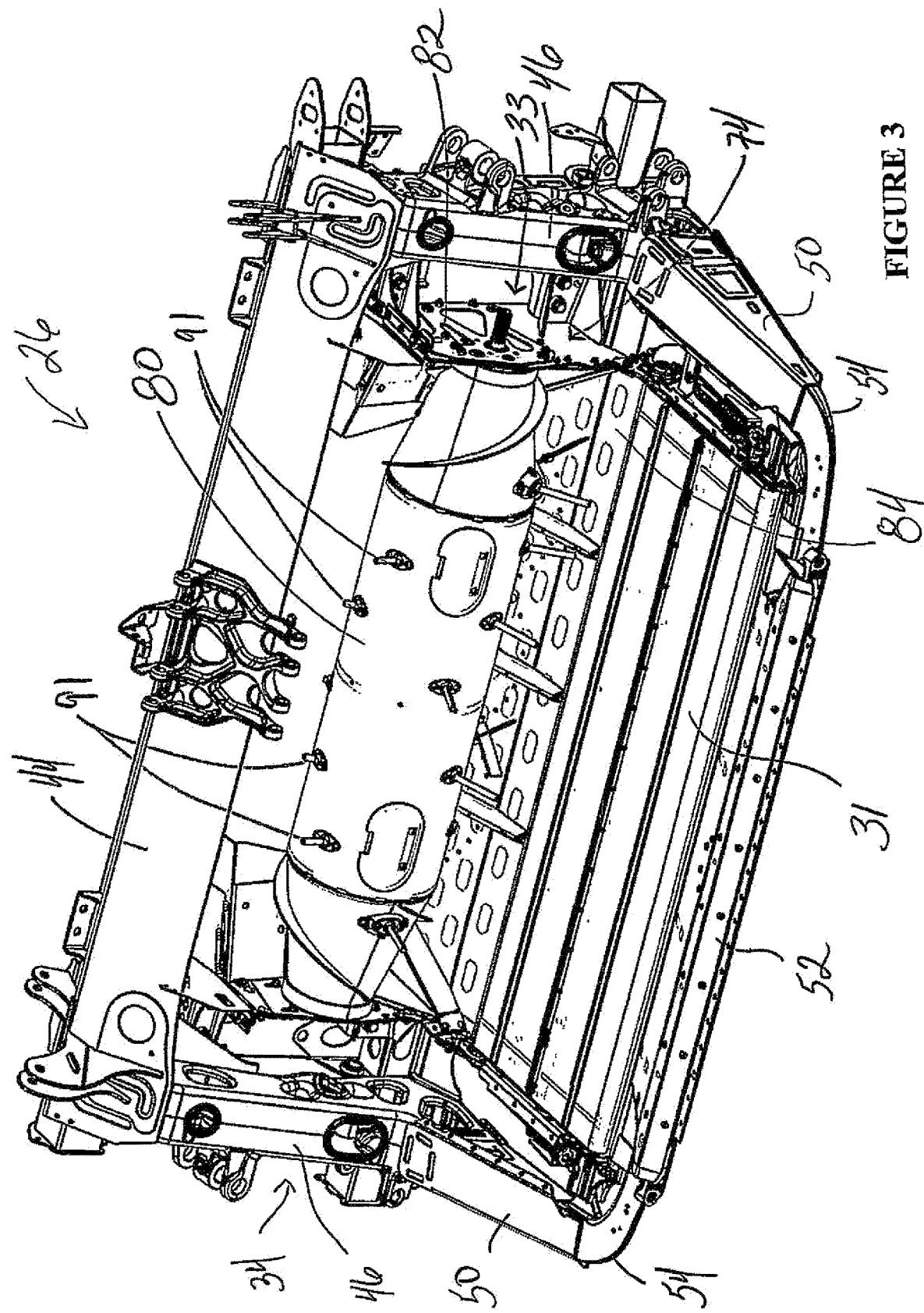
FIG. 3 illustrates a perspective view of a draper center section of the agricultural header.

FIGS. 1-3 illustrate an exemplary agricultural draper header 10 that is provided for use with an agricultural harvester 12, shown diagrammatically (e.g., a combine harvester). The agricultural header 10 is coupled to the agricultural harvester 12 to be propelled thereby in a forward direction of travel 14 over a field to harvester crop material. The header 10 cuts, gathers, and feeds the crop material to the harvester 12 for processing thereby.

The header 10 includes a cutter bar 16 extending laterally relative to the forward direction of travel 14 and configured to cut crop material. The cutter bar 16 can have a reciprocating knife that severs the stalk of the crop material. A reel 18 of the header 10 moves the cut crop material rearwardly, opposite to the forward direction of travel 14, onto draper belts of the header 10 behind the cutter bar 16, which transport the cut crop material to a feederhouse 20 of the harvester 12 for intake into the harvester 12 and processing thereby (feederhouse 20 is shown diagrammatically).

The header 10 includes a first side section 22, a second side section 24, and a center section 26 positioned laterally between the first and second side sections 22, 24. The first and second side sections 22, 24 are positioned on and coupled to laterally opposite sides of the center section 26 such that the first and second side sections 22, 24 extend in laterally opposite directions from the center section 26. The first side section 22 includes a first side draper belt 28, the second side section 24 includes a second side draper belt 30, and the center section 26 includes a center draper belt 31, the side draper belts 28, 30 and the center draper belt 31 being positioned behind the cutter bar 16 relative to the forward direction of travel 14 to receive cut crop material therefrom. Further, the first and second side draper belts 28, 30 extend laterally outwardly in opposite directions away from the center draper belt 31. Moreover, each of the first and second side draper belts 28, 30 are arranged to feed crop material laterally inwardly toward the center section 26. The center draper belt 31 is arranged to advance crop material received from the cutter bar 16 and the side draper belts 28, 30 toward the feederhouse 20.

The center section 26 is supported by and in communication with the feederhouse 20 when the header 10 is coupled to the harvester 12. The center section 26 includes a center support frame 33 coupled to the feederhouse 20 and a center main frame 34 coupled to the center support frame 33 for movement relative thereto. The center support frame

33 includes an attachment frame 36 coupled to the feederhouse 20 in fixed relation thereto.

The center main frame 34 is coupled to the attachment frame 36 for movement relative to the attachment frame 36 in response to changes in the terrain. Moreover, the center main frame 34 can be coupled to the attachment frame 36 via one or more hydraulic cylinders that can operate to regulate and/or establish a desired terrain-following capacity. The center main frame 34 can also include an upper lateral member 44, a first upright side member 46, and a second upright side member 46, the upper lateral member 44 being coupled fixedly (e.g., welded) to the upright side members 46. The upper links 40 are coupled pivotally to the attachment frame 36 and the center main frame 34.

Each side section 22, 24 has a side frame 56 and rollers mounted thereto. The cutter bar 16 can be coupled to the side frame 56 of each side section 22, 24. The side frame 56 supports the respective side draper belt 28, 30. The side draper belt 28, 30 is entrained about the rollers of the side section 22, 24 to form a closed loop. A motor drives one of the rollers to circulate the side draper belt 28, 30 about a closed-loop path.

Referring to FIG. 3, the side sections 22, 24 can be coupled to the center section 26 in a variety of ways. For example, each side frame 56 is coupled to the center main frame 34 with a set of links for movement relative thereto. Each of the links can be pivotally coupled to the side frame 56 and the center main frame 34. Additionally, a hydraulic cylinder can be utilized to pivot the side section 22, 24 and the side frame 56 thereof relative to the center main frame 34.

Referring to FIGS. 2 and 3, the center main frame 34 can include a first and a second fore-aft side member 50, a laterally-extending front member 52, and a first and second corner 54. The first fore-aft side member 50 is coupled fixedly (e.g., welded) to, and projects forwardly from, the first upright side member 46 of the center main frame 34. The second fore-aft side member 50 is coupled fixedly (e.g., welded) to, and projects forwardly from, the second upright side member 46 of the center main frame 34. The first corner 54 interconnects the first fore-aft side member 50 and the front member 52, and the second corner 54 interconnects the second fore-aft side member 50 and the front member 52. The cutter bar 16 is coupled to the front member 52.

The header 10 can also include a feed drum 80 and tines 91. The feed drum 80 is coupled rotatably to, and positioned laterally between, first and second side walls 82 of a feed frame 74 of the center support frame 33. Further, the feed drum 80 can be driven in rotation by a drum motor. The tines 91 project from the periphery of the feed drum 80 to advance cut crop material that is on, and/or has passed from, the center draper belt 31 and though the discharge opening of the header 10 and/or toward the intake of the feederhouse 20 upon rotation of the feed drum 80 by the drum motor. The feed drum 80 can generally extend over at least a portion of a drum floor 84 that is positioned between the center draper belt 31 and the feederhouse 20.

Figures 7, 8A:
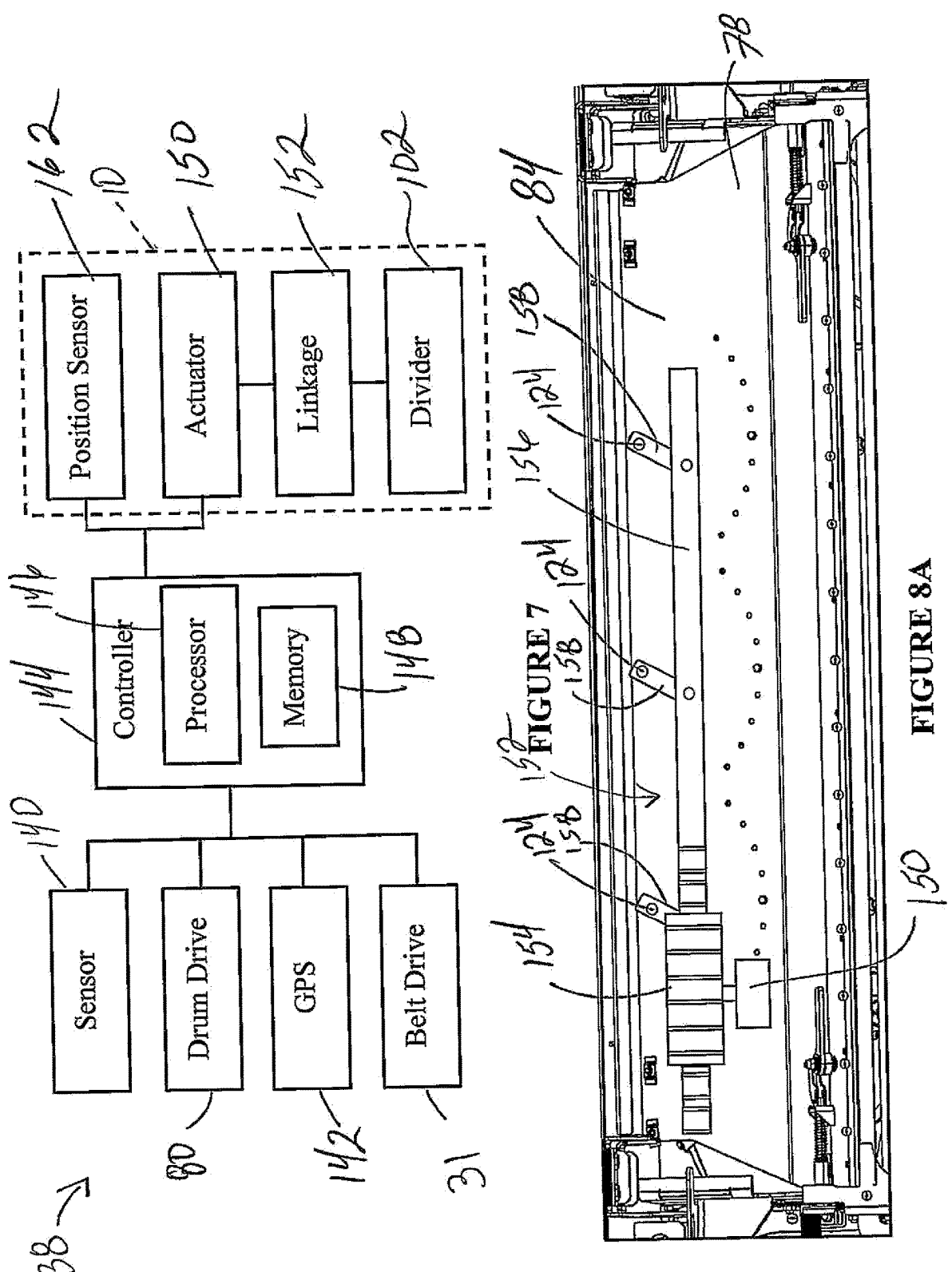
FIG. 7 illustrates a block diagram of an exemplary control system for the adjustable divider system.
FIGS. 8A and 8B illustrate an exemplary actuator system of the adjustable divider system being operated to position dividers at least opposing first and second positions, respectively.

The drum floor 84 can have a length that extends between opposing front and rear edges 92, 94, the front edge 92 being generally adjacent to the center draper belt 31 and the rear edge 94 being generally adjacent to the feederhouse 20. Further, the drum floor 84 can have a width between opposing first and second sides 96, 98, the first side 96 being located, compared to the second side 98, closer to the first side section 22 of the header 10, and the second side 98 being located, compared to the first side 96, closer to the second side section 24 of the header 10. Additionally, the drum floor 84 can have an upper side 76 and an opposing lower side 78 (FIG. 8A).

The center draper belt 31 is entrained about a front roller and a rear roller, the rear roller being driven in rotation by a motor to circulate the center draper belt 31 in a feeding direction to move crop material toward the feederhouse 20. As seen in at least FIG. 4A, crop material can travel along the center draper belt 31 toward the drum floor 84, the drum floor 84 being positioned at least beneath the feed drum 80. According to certain embodiments, the upper side 76 of the drum floor 84 can be generally downwardly offset in a vertical direction from the adjacent portion of the upper surface of the center draper belt 31 such that the drum floor 84 does not provide a barrier or obstacle to crop material traveling from the center draper belt 31 to the drum floor 84. Thus, crop material can experience a relatively small drop in vertical height as the crop material travels from the back end of the center draper belt 31 and onto an adjacent front edge 92 of the drum floor 84. Additionally, the tines 91 on the feed drum 80 can have as size, such as, for example, a length such that, as the feed drum 91 rotates, the tines 91 come into relatively close contact, but do not touch, the drum floor 84.

Figure 4A:
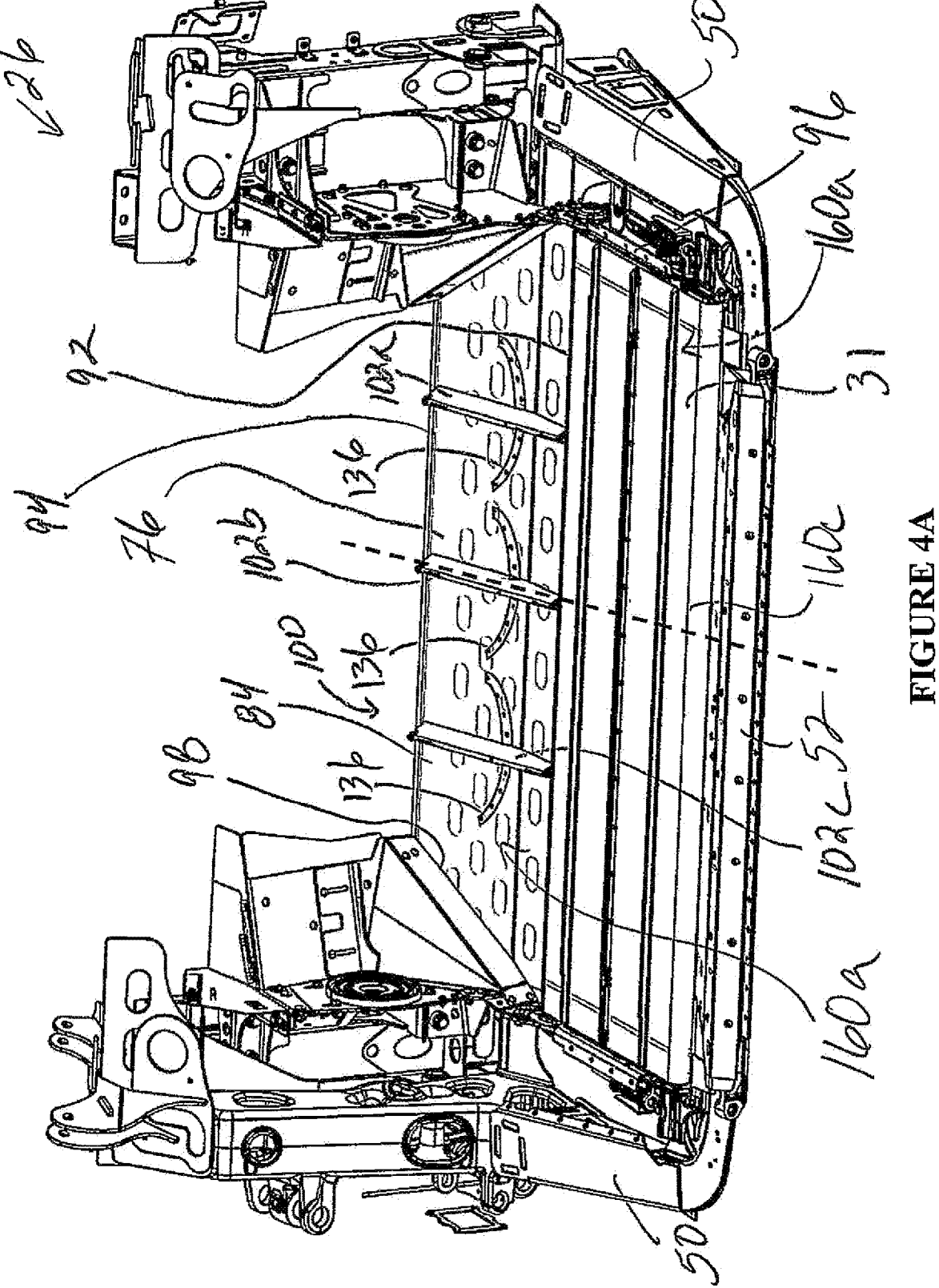
FIGS. 4A-4C illustrate a portion of the draper center section shown in FIG. 3 and including dividers of an adjustable divider system at various angular orientations.
Figure 4B:
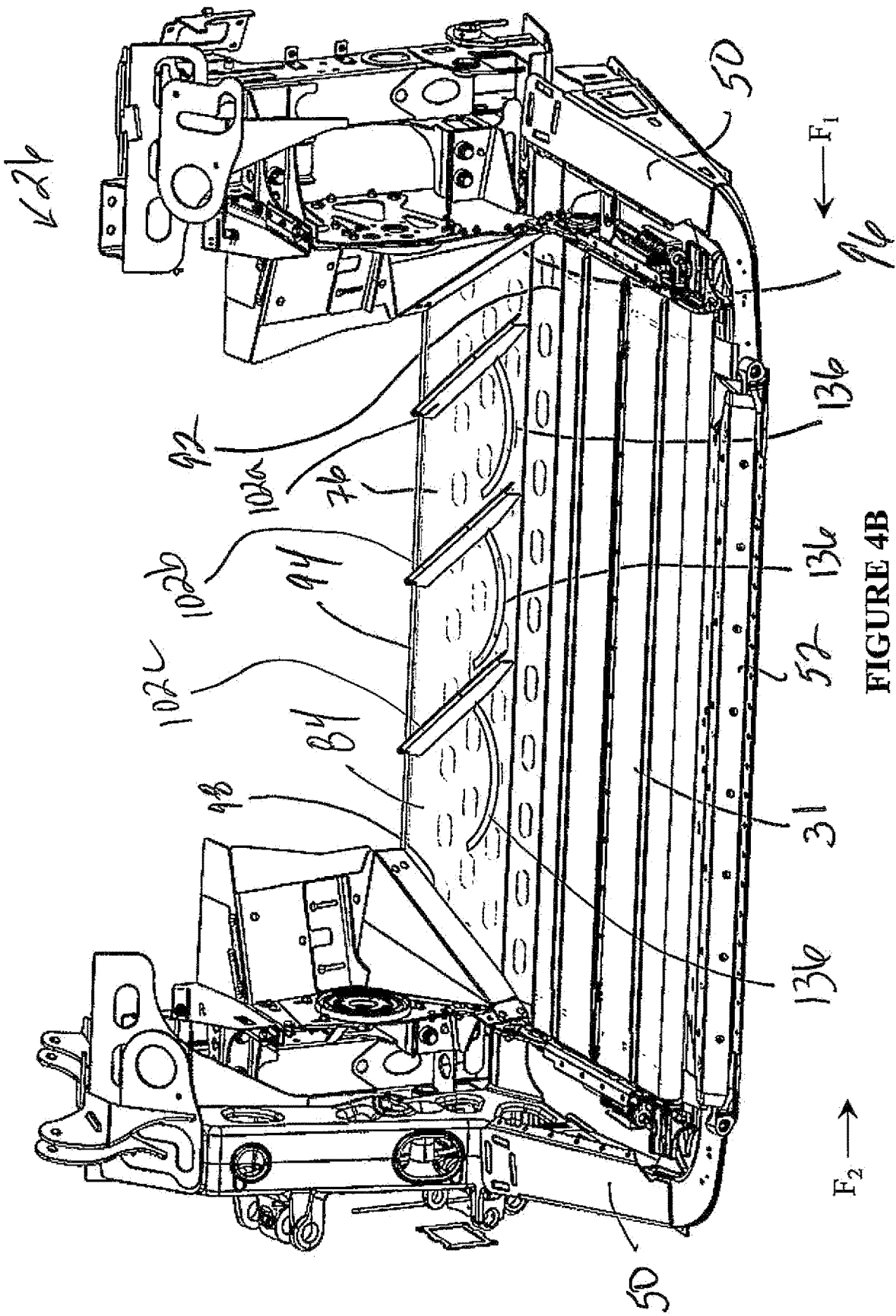
Figure 4C:
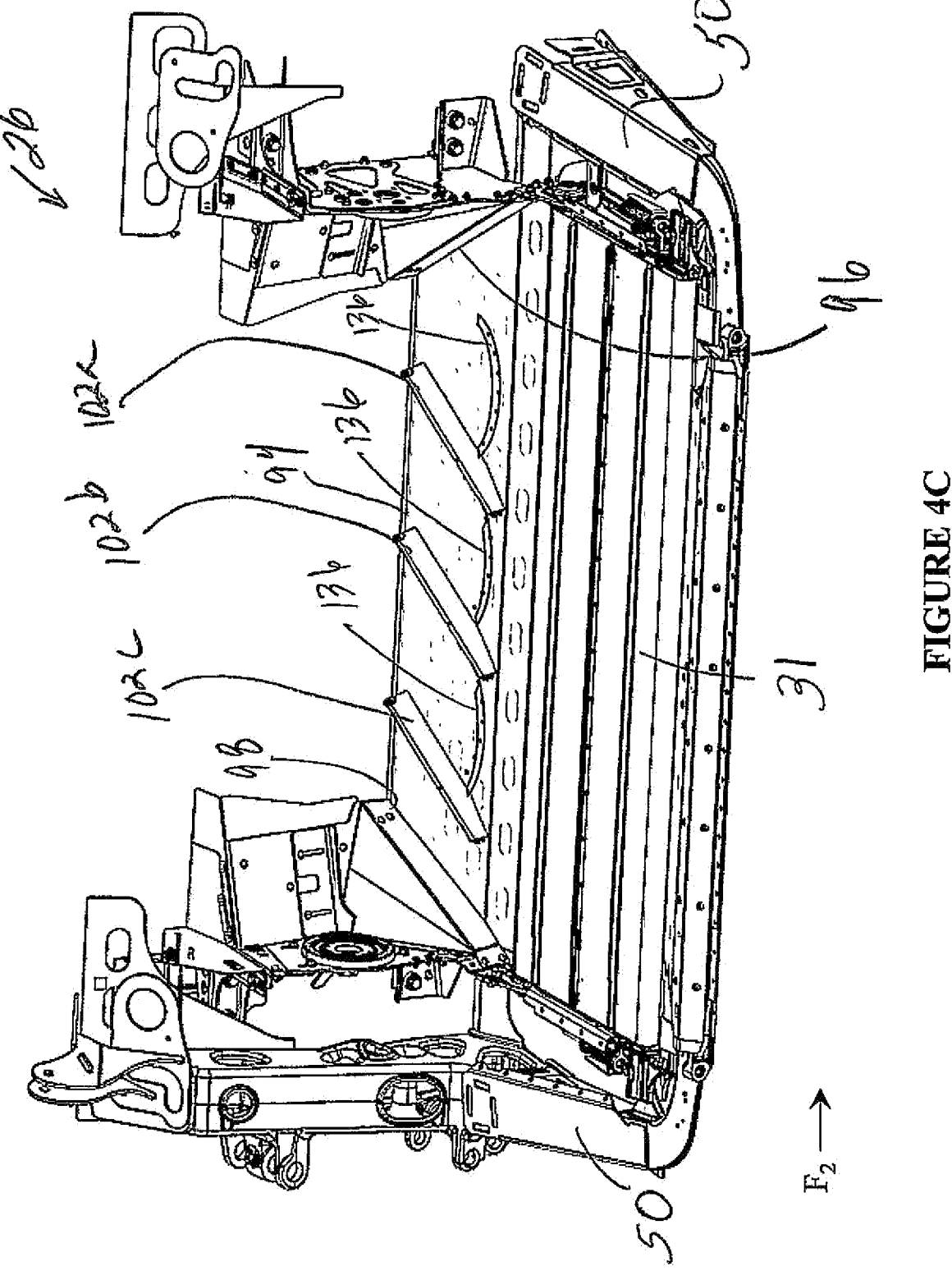

FIGS. 4A-4C illustrate a portion of the draper center section 26 shown in FIG. 3 and that includes an adjustable divider system 100 having a plurality of dividers or vanes 102*a-c* (generally referred to as divider 102) positioned at various angular orientations relative to at least the adjacent drum floor 84. The adjustable divider system 100 is configured to assist in distributing crop material passing through the discharge opening along and/or above the drum floor 84 and/or to at least attempt to improve the distribution of crop material that is passing from the center section 26 and into the feederhouse 20. As previously discussed, an improved, or more even, distribution of crop material entering into the feederhouse 20 can improve the capacity of the harvester 10, including with respect to subsequent cleaning of the crop material.

The adjustable divider system 100 can include a plurality of dividers 102 that can be pivotally coupled, and/or pivotally displaceable relative to, the drum floor 84. Referencing FIGS. 5A-5C, according to one embodiment, each divider 102 can include a divider wall 104 having a first, front end 106 and an opposing second, rear end 108, which can also provide a first end and a second end of the divider 102, respectively. According to the illustrated embodiment, the divider wall 104 can include a wall apex 110 at an upper region of the divider wall 104 from which opposing first and second sidewalls 112, 114 of the divider wall 104 can generally downwardly and outwardly extend to a corresponding bottom wall edge 118 of the first and second sidewalls 112, 114. The first and second sidewalls 112, 114 and the wall apex 110 can generally define an inner region 116 of the divider 102 that may, or may not, be enclosed at least at the first end 106 and/or be at least partially filled with a filler material, including, but not limited to, by a plastic or rubber material, among other materials. While the divider 102 can have any number of shapes and configurations, as seen in at least FIG. 5C, in the illustrated embodiment the divider 102, and/or inner region 116, has a generally inverted "V" shape such that the distance between the first and second sidewalls 112, 114 across the inner region 116 increases as the first and second sidewalls 112, 114 each generally downwardly extend toward the respective wall edge 118. Additionally, the divider 102 can have an overall vertical height between at least the wall apex 110 and the wall edge 118 that is sized to minimize or prevent the tines 91 from contacting the divider 102 during operation of the feed drum 80.

Figure 10A:
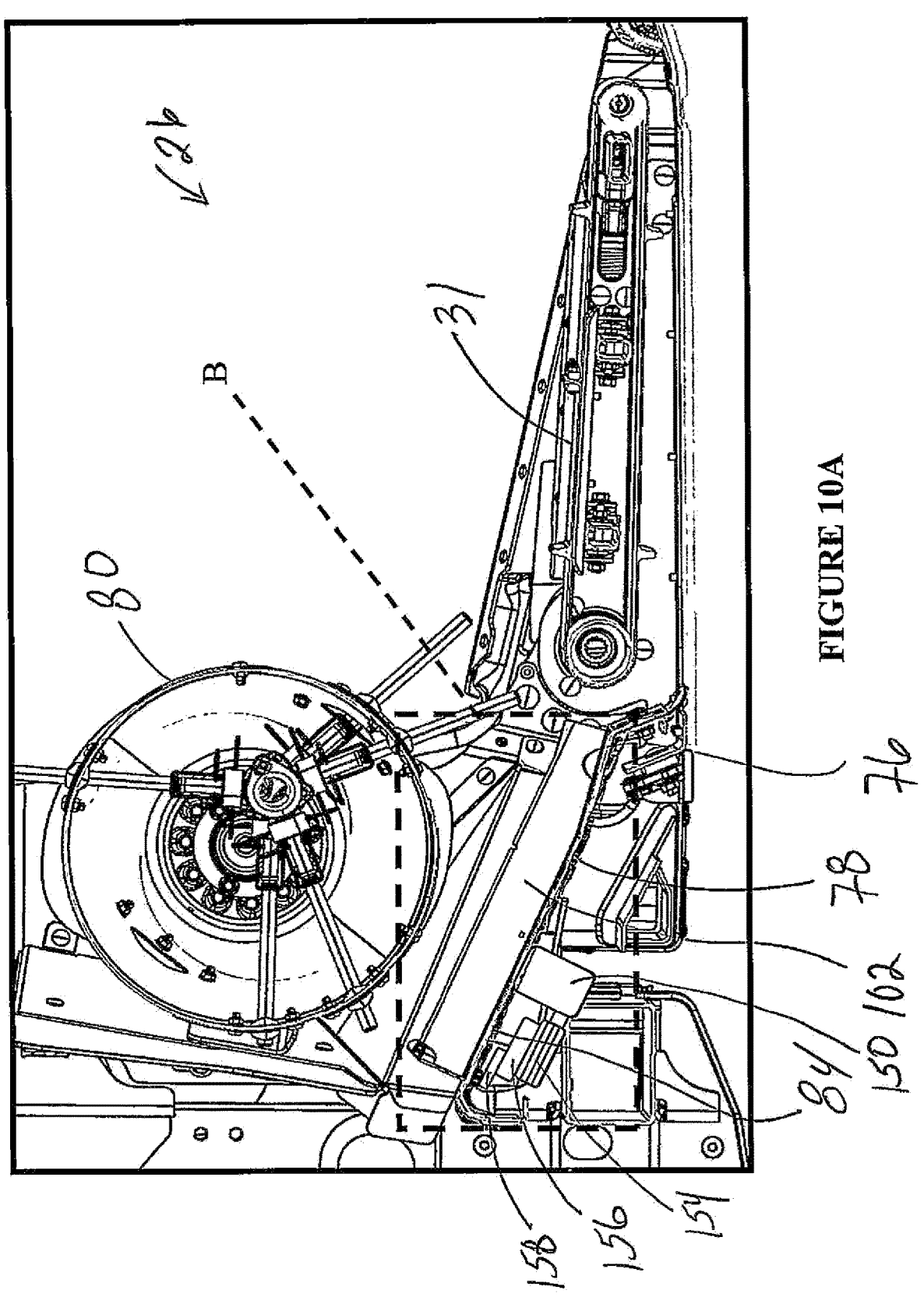
FIG. 10A illustrates a cutaway side view of the draper center section shown in FIG. 3.
Figure 10B:
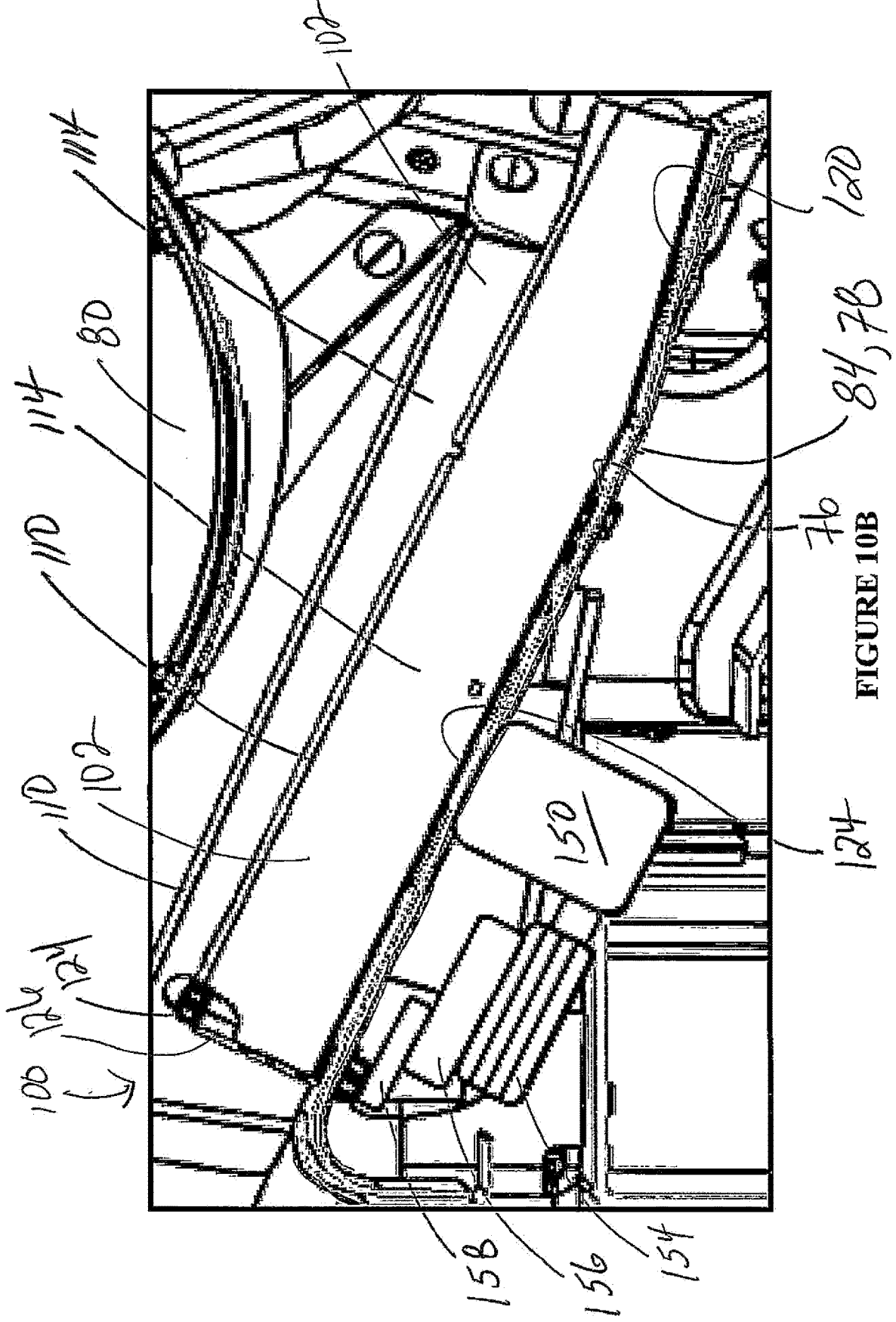
FIG. 10B illustrates an enlarged portion of the area of the cutaway side view that is identified as "B" in FIG. 10A.

The wall edge 118 of the first and second sidewalls 112, 114 can have any number of shapes and configurations. For example, in the illustrated embodiment, the wall edge 118 includes a first, leading section 120 and a second, trailing section 122, the first, leading section 120 being located between the first end 106 of the divider wall 104 and the second, trailing section 122, and the second, trailing section 122 extending between the first, leading section 120 and the second end 108 of the divider wall 102. Further, the first, leading section 120 can extend at an incline or angle away from the first end 106 and toward the second, trailing section 122 at an angle or incline that is different than an angle or incline at which the second, trailing section 122 extends toward the second end 108. The angles at which the first, leading section 120 and the second, trailing section 122 of the divider wall 104 extend can be based on the configuration of the upper side 76 of the drum floor 84. Moreover, the first, leading section 120 and the second, trailing section 122 can be configured such that, when the divider 102 is operably mounted to the drum floor 84, each of the first, leading section 120 and the second end 108 of the divider wall 104 is generally parallel to the associated adjacent portion of the upper side 76 of the drum floor 84, as seen for example, in at least FIGS. 10A and 10B. Additionally, according to other embodiments, a portion of the first end 106 of divider 102 can also be configured to extend over a portion of the center draper belt 31 in a manner in which contact between the divider 102 and the center draper belt 31 is prevented and/or minimized.

According to certain embodiments, the divider 102 is sized, such as, for example, have a length, to prevent the divider 102 from reaching, or extending over, the center draper belt 31, and thus the divider 102 can instead be sized to be generally confined to extending over the drum floor 84. Alternatively, the divider 102 can be sized to extend over at least a portion of the center draper belt 31. With respect to such embodiments, at least a portion of first, leading section 120 may also be configured to prevent the divider 102 from coming into contact with the center draper belt 31, such as, for example, via inclusion of a recess or other inclined portion of the first, leading section 120. Additionally, or alternatively, the first, leading section 120 can be inclined or otherwise configured to prevent or minimize the divider 102 in the general area of the first end 106 from being deflected or bent into contact with the drum floor 84 in response to a force imparted on the divider 102 as crop material is passed from the center draper belt 31 and onto or over the drum floor 84.

The divider 102 can also be configured to either include, or receive, a pivot body 124, such as, for example, a pin or post, among other bodies, about which the divider 102 can be pivotally displaced and/or can facilitate pivotal displacement of the divider 102 about the drum floor 84. The pivot body 124 can be directly or indirectly coupled to an actuator of the adjustable divider system 100 so that the divider 102 can be pivotally displaced relative to at least the drum floor 84 via selective operation of the actuator. Additionally, the pivot body 124 can be coupled to the divider 102 at a variety of locations, including, for example at or near the first end 106, second end 108, or a location between the first and second ends 106, 108. For example, in the embodiment shown in FIG. 6, the divider 102 includes a pivot housing 126 that, in the illustrated embodiment is coupled to the second end 108 of the divider wall 104. As seen in at least FIG. 5C, according to certain embodiments, the divider wall 104 is configured to provide a recess or cavity 128 that has a size, such as, for example, a diameter, to receive at least a portion of the pivot housing 126. Further, the pivot housing 126 is sized to receive the pivot body 124, which in this example may extend at least partially, if not completely, into an orifice in the pivot housing 126. The pivot housing 126, or, alternatively, the pivot body 124, can be secured to the divider wall 104 in a variety of manners, including, for example, via one or more welds and/or mechanical fasteners, including, but not limited to, screws, bolts, pins, and rivets, among other fasteners. According to other embodiments, the pivot housing 126, or, alternatively, the pivot body 124, and the divider wall 104 may be part of a single, monolithic structure.

Figures 5A, 5B, 5C, 6A, 6B:
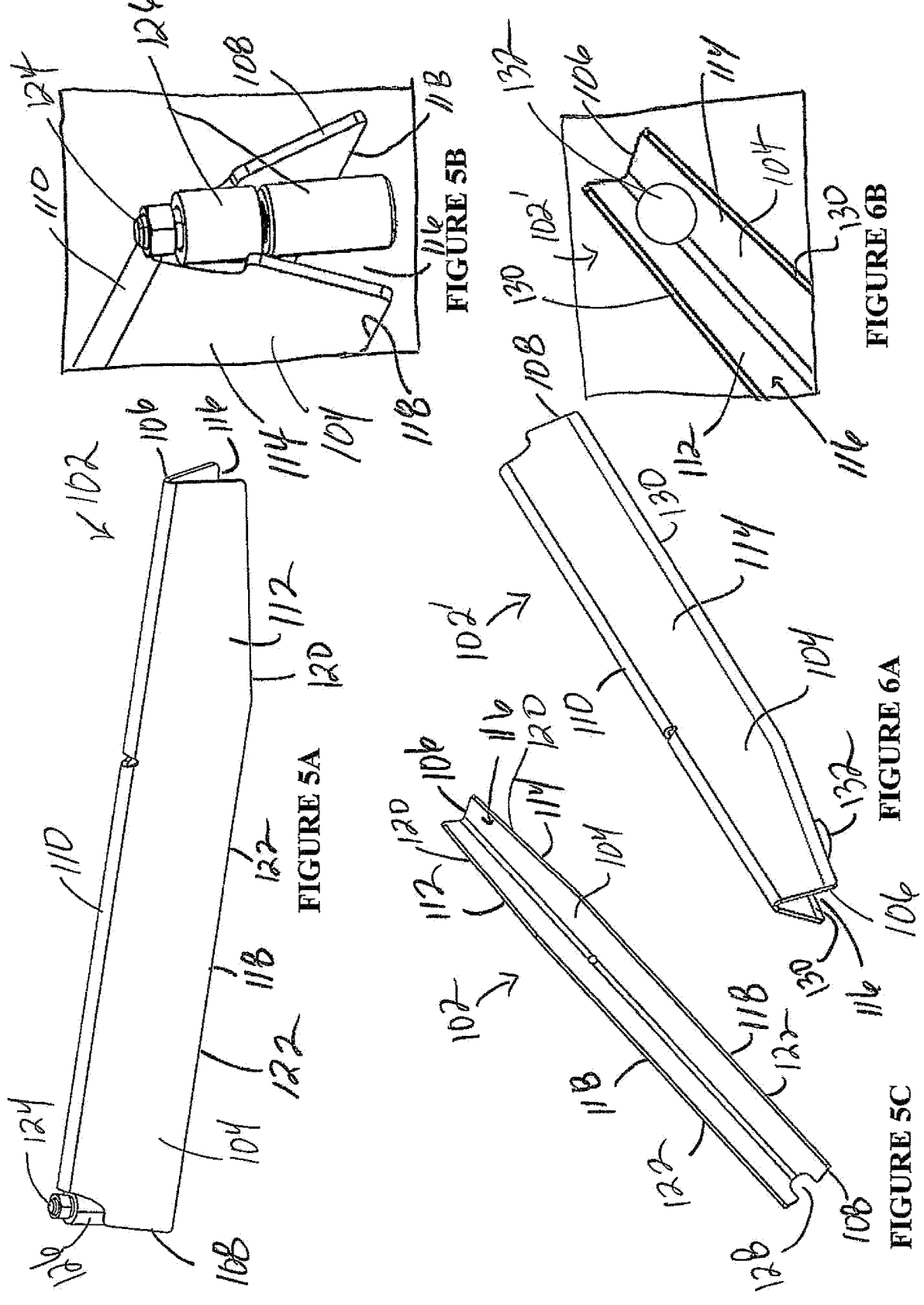
FIGS. 5A-5C illustrate exemplary embodiments of the dividers shown in FIGS. 4A-4C.
FIGS. 6A and 6B illustrate an exemplary alternative embodiment of the dividers shown in FIGS. 4A-4C.

The divider wall 104 and/or the divider 102 can be constructed from a variety of metallic and non-metallic materials and/or be a composite structure. For example, according to certain embodiments, at least the divider wall 104 can be constructed from a sheet steel material, stainless steel, polyester, or plastic, among other materials. Additionally, or optionally, as seen in FIG. 6A, according to certain embodiments, the wall edge 118 can include wear edge 130 constructed from a material that is different than a material of the other portions of the divider wall 104. For example, the wear edge 130 can, according to certain embodiments, be a material that is more ductile and/or deformable than a material used for at least the adjacent first and second sidewalls 114, 116, including, for example an elastomer or elastic polymer. Alternatively, the wear edge 130 can include a material that has a hardness that is greater than a hardness of the first and second sidewalls 112, 114. Further, according to other embodiments, the wear edge 130 is a portion of a monolithic divider wall 104 that has been subjected to a heat treatment process such that the wear edge 130 has a hardness that is greater than a hardness along other portions of the divider wall 104.

As seen in FIGS. 6A and 6B, according to certain embodiments, the divider 102 can also include a guide protrusion 132, such as, for example, a post or other projection that can extend in a generally downward direction below the wall edge 118. The guide protrusion 132 can be configured to mate with one or more guide apertures 136 (see e.g., FIG. 4A) in the drum floor 84 as the divider 102 is rotatably displaced. The guide protrusion 132 can be located at a portion of the divider 102 that is different than the location at which the pivot housing 126 and/or pivot body 124 is positioned. For example, one of the guide protrusion 132 and the pivot housing 126 and/or pivot body 124 can be located at, or around, the second end 108 of the divider wall 104, and the other of the guide protrusion 132 and the pivot housing 126 and/or pivot body 124 can be located at, or around, the first end 106 of the divider wall 104. Thus, as demonstrated by at least FIGS. 5B and 6B, according to certain embodiments, the pivot housing 126 and/or pivot body 124 is located at, or around, the second end 108 of the divider wall 104, and the guide protrusion 132 is located at, or around, the first end 106 of the divider wall 104, although an opposite arrangement is also contemplated.

The mating guide aperture 136 can have a variety of shapes, sizes, and/or configurations, and may partially, or completely extend into or through the drum floor 84. Moreover, the guide aperture 136 can have a shape, or otherwise be arranged, to correspond to both the shape of the guide protrusion 132 and the path of travel the mating guide protrusion 132 can take when being rotatably displaced with the displacement of the associated divider 102. For example, FIG. 4B illustrates a guide aperture 136 in which the guide aperture 136 is a generally arc-shaped slot in the drum floor 84.

The guide protrusion 132 can be constructed from a material similar to the material discussed above with respect to the divider wall 104 and/or the wear edge 130. Thus, the guide protrusion 132 may, or may not, be constructed form the same material used for the construction of the divider wall 104. Additionally, the guide protrusion 132 and the divider wall 104 can be part of a unitary monolithic structure. Alternatively, the guide protrusion 132 can be secured to the divider wall 104, such as, for example, via one or more welds and/or via a mechanical fastener(s).

While FIGS. 6A and 6B illustrate additional, optional features for the dividers 102 shown in FIGS. 5A-5C, one or more of such features, namely the wear edge 130 and/or guide protrusion 132, can be included with the other embodiments of dividers illustrated throughout this disclosure, as well as with variations thereof.

FIG. 7 illustrates a block diagram of an exemplary control system 138 for the adjustable divider system 100. As seen, the adjustable divider system 100 can include a plurality of sensors 140 that can provide information indicative to crop and/or crop material distribution. The sensors 140 can include one or more sensors that allow a proactive, reactive, and/or real-time operation of the adjustable divider system 100 via associated adjustments in the angular orientation of the dividers 102*a-c* via selective operation of the actuator(s). Such real-time operation can include operation of the adjustable divider system 100 based on current crop and/or crop material distribution, as sensed by the sensor(s) 140, including, but not limited, current crop material distribution at the center draper belt 31 and/or drum floor 84, among other locations along the harvester 12 and/or header 10.

Proactive operation of the adjustable divider system 100 can generally pertain to operation of the adjustable divider system 100, such as selective pivotal displacement of one or more of the dividers 102, in response to a prediction or estimation that is based on information from a sensor(s) 140 of an anticipated upcoming distribution of crop material at one or more locations along of the harvester 12. Moreover, proactive operation of the adjustable divider system 100 can be based on information regarding crops or crop materials from locations upstream of the center draper belt 31 and/or the drum floor 84. For example, according to certain embodiments, the sensors 140 can include at least one sensor, such as, for example, an optical sensor, that can detect variation in the density of crops that the harvester 12 is approaching. Moreover, information provided by such a sensor 140 can indicate that more crop, or a denser collection of crops, are generally located adjacent to one of the first side section 22 and a second side section 24 of the header 10, indicating that, when cut, more crop material will be laterally inwardly feed from that side section, such as, for example, the first side section 22, toward the center section 26 than will be feed from the other side section 24. Additionally, or alternatively, one or more sensors 140, such as, for example, optical, weight, force, and/or load sensors, among others can be positioned at various locations about the header 10, such as at or around the first and second side sections 22, 24 and/or the center section 26, including, on or around the first side draper belt 28, the second side draper belt 30, and/or the center draper belt 31. Information from such sensors 140, and, moreover, differences in the information provided by such sensors 140, can be used to predict and anticipate imbalance in the crop material that will be arriving at different sides of the center draper belt 31, and thus an associated potential imbalance in crop distribution at the discharge opening and/or intake of the feederhouse 20.

Additionally, according to certain embodiments, the sensor(s) 140 can include at least one sensor, for example, a tilt sensor or inclinometer, among others types of sensors, that can detect an angular orientation of the harvester 12 and/or header 10, including, for example, an angular origination of first and/or second side sections 22, 24, either individually or collectively. Information from such sensors, including, but not limited to the extent of the incline, can be used to determine the extent cut crop material can be anticipated to be downwardly pulled as the result of such an incline in a manner that can contribute to a generally uneven distribution of crop material at least at the center draper belt 31. Moreover, such information can be utilized to position one or more, if not all, of the dividers 102a-c in a manner that can compensate for anticipated uneven distribution that may occur with respect to the crop being delivered to the draper center section 26 so as to at least attempt improve the distribution of the crop material that is exiting the discharge opening and entering the feederhouse 20.

Additionally, or alternatively, the sensor(s) 140 can include a location system 142, such as, for example, a global positioning system (GPS). The location system 142 can be operated to provide a detailed indication of the location of the harvester 12, particularly as the harvester 12 traverses across the field. For example, according to certain embodiments, the location system 142 can include a receiver that can receive information from an external source that can indicate the particular location of the harvester 12, including, for example, via location coordinates. Such location information can be utilized in connection with information of the associated terrain about which the harvester 12 is traveling. Moreover, the associated terrain information can indicate whether the header 10 and/or one or both of the and/or second side sections 22, 24 will be, and/or already are, positioned along a hill or incline that could result in cut crop material being pulled, or otherwise unevenly distributed, along the header 10 in a manner that can contribute to a generally uneven distribution of crop material at least at the center draper belt 31. Again, such information can be utilized to determine whether an adjustment is to be made to the angular orientation of one or more, if not all, of the dividers 102a-c to least attempt improve the distribution of the crop material that is exiting the discharge opening and entering the feederhouse 20.

Additionally, or alternatively, the location system 142 can provide an indication of anticipated variation in the density of crops that the harvester 12 is approaching. For example, information provided by the location system 142 can be used in connection with a determination that the harvester 12 is approaching a portion of the field where moisture content in one area over which the first side section 22 of the header 12 will travel is higher than another portion of the field over which the second side section 24 will travel. Such differences in moisture content can relate to a different in crop quantity or density in those different portions of the field, which can lead to more crop material being feed by one of the first and second side sections 22, 24 to the center draper belt 31. Again, such information can be utilized to determine whether an adjustment is to be made to the angular orientation of one or more, if not all, of the dividers 102a-c to least attempt improve the distribution of the crop material that is exiting the discharge opening and entering the feederhouse 20.

According to certain embodiments, the sensor(s) 140 can provide information indicating uneven crop material distribution at or along the feed drum 80. For example, according to certain embodiments, the feed drum 80 can include one or more strain gages and/or load/force sensors. Such sensors 140 can provide information indicative of different areas or regions of the feed drum 80 being subjected to different force or loads, which can be correlated to the feed drum 80 being encountering or engaging non-uniform crop distribution. Using such real-time information, a determination can be made as to an adjustment is to be made to the angular orientation of one or more, if not all, of the dividers 102a-c to least attempt improve the distribution of the crop material that is exiting the discharge opening and entering the feederhouse 20.

Reactive sensing can be based on information from the sensor(s) 140 from a location downstream of the feed drum 80 and/or from a region within, and/or downstream of, the feederhouse 20. For example, one or more sensors 140, including, for example, a weight sensor and/or an optical sensor, can provide information as to the distribution of crop material within a cleaning chute in the feederhouse 20 of the harvester 12 at which collected crop that can be further processed can be separated from crop residue. Additionally, or alternatively, a sensor 140, such as, for example, a camera or optical sensor, can detect uneven crop distribution based on an uneven expulsion of crop material, such as crop residue, from the rear or back end of the harvester 12, including, for example, through an aperture at a rear end of the harvester 12. Such information can also be used to determine whether one or more, if not all, of the dividers 102a-c are to be adjusted so as to at least attempt to improve the uniformity of crop material that is entering into the feederhouse 20.

Information obtained via from the sensor(s) 140 can be communicated to a controller 144 of the harvester 12. The controller 144 can include at least one or more processors 146 and one or more memory devices 148. The processor 146 can be embodied as any type of processor or other compute circuit capable of performing various tasks such as, for example, correlating information from the sensor(s) 140 to corresponding crop material distribution, as well as associated computations and controlling communications with other components of the adjustable divider system 100, among other functions. In some embodiments, each processor 146 can be embodied as a single or multi-core processor, a microcontroller, or other processing/controlling circuit. Additionally, in some embodiments, each processor 146 may be embodied as, include, or be coupled to an FPGA, an application specific integrated circuit (ASIC), reconfigurable hardware or hardware circuitry, or other specialized hardware to facilitate performance of the functions described herein. In some embodiments still, each processor 146 can be embodied as a high-power processor, an accelerator co-processor, an FPGA, or a storage controller.

Each memory device 148 can be embodied as any type of volatile (e.g., dynamic random access memory (DRAM), etc.) or non-volatile memory capable of storing data therein. Volatile memory can be embodied as a storage medium that requires power to maintain the state of data stored by the medium. Non-limiting examples of volatile memory can include various types of random access memory (RAM), such as dynamic random access memory (DRAM) or static random access memory (SRAM). In some embodiments, each memory device 148 can be embodied as a block addressable memory, such as those based on NAND or NOR technologies. Each memory device 148 can also include future generation nonvolatile devices or other byte addressable write-in-place nonvolatile memory devices. Additionally, in some embodiments, each memory device 148 can be embodied, or otherwise include, a memory device that uses chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. Each memory device 148 can refer to the device itself and/or to a packaged memory product. In some embodiments still, 3D crosspoint memory can include a transistor-less stackable cross point architecture in which memory cells sit at the intersection of word lines and bit lines and are individually addressable and in which bit storage is based on a change in bulk resistance. In some embodiments yet still, all or a portion of each memory device 148 can be integrated into the processor(s) 146. Regardless, each memory device 148 can store various software and data used during operation such as task request data, kernel map data, telemetry data, applications, programs, libraries, and drivers. Thus, the memory devices 148 can include information, including, but not limited to, algorithms and look-up tables, among other information, that can used by the processor 146 if correlating information provided by the sensors 140 into an indication, prediction, and/or measurement of the distribution of crop material.

The adjustable divider system 100 further includes one or more actuators 150 that are coupled to the controller 144. The actuator(s) 150 and are utilized to provide a force that can be directly or indirectly transmitted to the one or more of the dividers 102 so as to pivotally displace the angular orientation of the dividers 102*a-c*. A variety of different types of devices can be utilized as the actuator(s) 150, including, for example, electric actuators, hydraulic actuators, pneumatic actuators, rotary actuators, and linear actuators, among others. The location of the actuator 150 can be at least partially dependent on the manner in which the associated force is transmitted from the actuator 150 and to the pivot body 124. According to certain embodiment, the actuator is positioned beneath, and/or coupled to, the lower side 78 of the drum floor 84.

FIGS. 8A-8B and 10A-10B illustrate an example of an actuator 150 positioned and configured for indirect transmission of power to the pivot body 124 of each of a plurality of dividers 102 via a linkage system 152. According to certain embodiments, the actuator 150, as well as components, if any, of the adjustable divider system 100 used to transit power from the actuator to the dividers 102, can be located to beneath the drum floor 84, among other portions of the center main frame 34. For example, as seen, one or more actuators 150 can be mounted to the lower side 78 of the drum floor 84.

Figures 8B, 9:
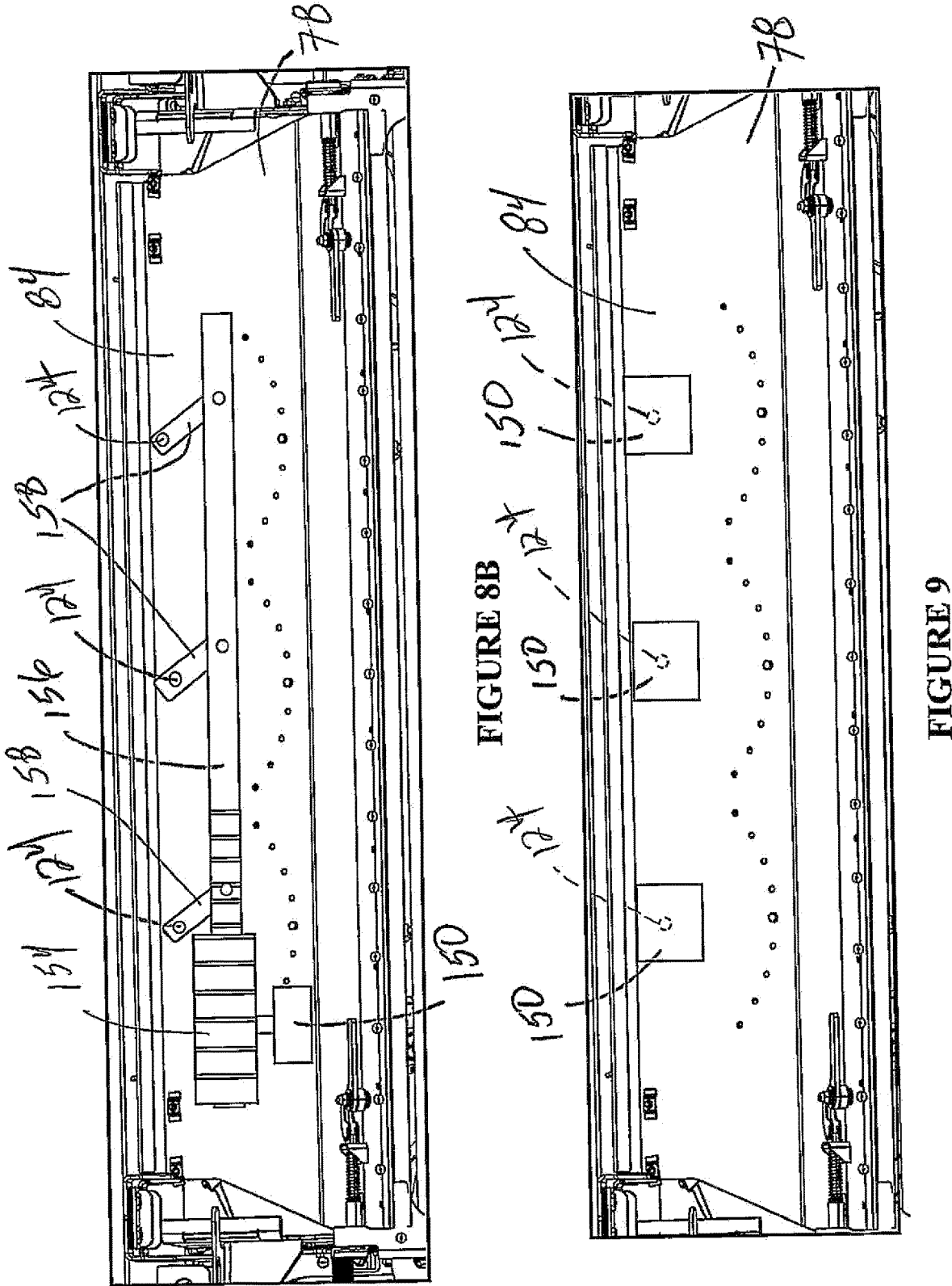
FIG. 9 illustrates another exemplary actuator system of the adjustable divider system.

More specifically, referencing the exemplary embodiment shown in FIGS. 8A and 8B, the adjustable divider system 100 can include a pinion 154 and mating rack gear 156, and one or more arm links 158, the arm links 158 being coupled to the rack gear 156 and the pivot body 124 or pivot housing 126. According to such an embodiment, the pinion 154 is coupled to an actuator 150 at a location beneath the drum floor 84, or other portion of the header 10, and rotated via operation of the actuator 150. The engagement between the rotating pinion 154 and the rack gear 156 facilitates linear displacement of the rack gear 156, the direction of such linear displacement being controlled by the direction at which the pinion 154 rotates, which can be controlled by the controller 144. Such linear displacement of the rack gear 156 causes at least a portion of the link arm 158 to be pushed push or pulled in a manner that can cause the portion of the link arm 158 that is coupled to the pivot body 124 or pivot housing 126 to transmit a rotation or pivotal force the pivot body 124 or pivot housing 126, thereby causing rotational displacement of the associated divider 102.

In the embodiment shown in FIGS. 8A and 8B, three link arms 158 are provided, one link arm 158 being provided for each divider 102. However, other embodiments may have a different number of link arms 158, and/or one or more of the link arms 158 can be coupled to the pivot body 124 or pivot housing 126 of a plurality of dividers 102. Additionally, other linkage configurations, among other manners of directly or indirectly transmitting power from the actuator 150 to rotatably displace the dividers 102, can be utilized. For example, FIG. 9 illustrates an embodiment in which, rather than utilizing a linkage system 152, a separate actuator 150 is directly coupled to each divider 102. According to such embodiments, each actuator 150 can be individually controlled via the controller 144 operating each actuator 150 individually such at least one divider 102*a-c* may not be rotatably displaced the same, and/or may not have the same orientation relative the drum floor 84 and incoming crop material, as at least one other divider 102*a-c*.

FIGS. 4A-4C illustrate the plurality of dividers 102*a-c* of the adjustable divider system 100 at a central position (4A), a first position (FIG. 4B), and a second position (FIG. 4C). While three positions for the dividers 102 are illustrated, the dividers 102*a-c* can be at a variety of positions, as well as combination of positions, between the first and second positions. Additionally, while FIGS. 4A-4C each illustrate the dividers 102*a-c* at the same angular orientation relative to at least the drum floor 84, according to certain embodiments, one or more of the dividers 102*a-c* can be at an orientation that is different than the orientation of other dividers 102*a-c*. For example, at least one of the dividers, such as, for example, a first divider 102*a* can be at the first position, while at least one of the other dividers 102*b*, 102*c*, can be at the central or second position, among other positions between the first and second positions. Further, while FIGS. 4A-4C illustrate an adjustable divider system 100 having three dividers 102*a-c*, the number of dividers 102 included with the adjustable divider system 100 can vary.

As discussed above, one or more sensor 140 can provide information that can be used by the controller 144 to estimate, predict, or otherwise detect whether the distribution of crop material that will, has, and/or had reach/reached the center draper belt 31 and/or the drum floor 84 is unbalanced. Such a determination by the controller 144 can, for example, identify one or more of a first outer region 160*a*, a second outer region 106*b*, and central region 160*c* therebetween of the center draper belt 31 and/or the drum floor 84 will be, is, and/or has experiencing/experienced a larger amount or weigh of crop material that one or more of the other regions 160*a-c*. In response to such a determination, the controller 144 can determine if the degree or level of unbalance in crop material distribution satisfies a predetermined threshold level. For example, at times, the degree of unbalance may be generally minimal and/or to a degree that may adversely impact the capacity of the harvester 12. In such situations in which the threshold level is not satisfied, the controller 144 may not generate any commands to adjust an orientation or position of one or more dividers 102a-c. However, in the event the threshold level is satisfied and/or exceeded, the controller 144 can generate a command to operate the actuator(s) 150 in a manner in which the dividers 102a-c can be rotatably displaced to a position at which the dividers 102a-c are orientated to influence the direction at which crop material reaches the feed drum 80 and/or passes into the feederhouse 20.

For example, in the event information from the one or more sensors 140 indicates that the amount crop material flowing, or will be flowing, from the first side section 22 (as generally indicated by the flow direction "F₁" in FIG. 4B) to the center draper belt 31 is greater than the amount of crop material that will be flowing toward the center draper belt 31 from the second side section 24 (as generally indicated by the flow direction "F₂" in FIG. 4B), the controller 144 can selectively rotatably displace the dividers 102a-c to the first position such that dividers 102a-c at least attempt to direct at least a portion of the crop material passing along the drum floor 84 generally away from the first side 96 and/or toward the second side 98 of at least the drum floor 84. The position or orientation at which the dividers 102a-c are to be rotated, if at all, can be based at least in part on a determination by the controller 144 as to the extent the crop material should be distributed by the adjustable divider system 100 so as to more evenly balance or distribute the crop material across the drum floor 84 and into the feederhouse 20.

Further, the extent that the actuator 150 is to be operated to position the dividers 102a-c at desired orientations can be based on a variety of criteria. For example, as indicated in FIG. 7, according to certain embodiments, the adjustable divider system 100 can include one or more position sensors 162 that can provide information indicative of, or relating to, at least the current position and/or orientation of one or more of the dividers 102a-c. For example, according to certain embodiments, the position sensor 162 can be a rotary, linear, and/or position encoder or sensor, including, for example, a shaft or rotary encoder that is part of, or otherwise coupled to an actuator 150. Alternatively, or additionally, the position sensor 162 can include at least one Hall Effect sensor or capacitive sensor, among other direct contact or non-contact sensors. According to certain embodiments, the controller 144 can, using information from the sensor 162, including, for example, the current position of the divider(s) 102a-c and information regarding the location or orientation that the divider(s) 102a-c is/are to be at to at least attempt to improve the distribution of the crop material, determine an extent or duration of time that the actuator(s) 150 is/are to operate to displace the divider(s) 102a-c to the selected location or orientation.

Determinations of whether the orientation of one or more of the dividers 102a-c is/are, or is/are not, to be adjusted via operation of the actuator 150 can be relatively dynamic and occur in real-time. For example, according to certain embodiments, particularly with respect to proactive sensing, the controller 144 can receive information regarding an anticipated change in the balance of crop material that is anticipated to be delivered to at least the drum floor 84. The controller 144 can utilize information regarding the travel speed of the harvester 12, as well as the speeds of the side draper belts 28, 30 and the center draper belt 31 to predict a time at which the distribution of the crop material can be expected to become unbalanced, or the unbalanced crop material distribution is anticipated to arrive, at least at the drum floor 84. Based on such information, the controller 144 can determine the timing at which the dividers 120a-c are to be begin being rotatably displaced and/or when such rotatable displacement of the dividers 102a-c is to be completed. Such a process of determining when, and/or the extent, the dividers 102a-c are to be displaced via operation of the actuator 150 can be generally continuous at least while the harvester 12 is engaged in harvesting crop.

Figure 11A:
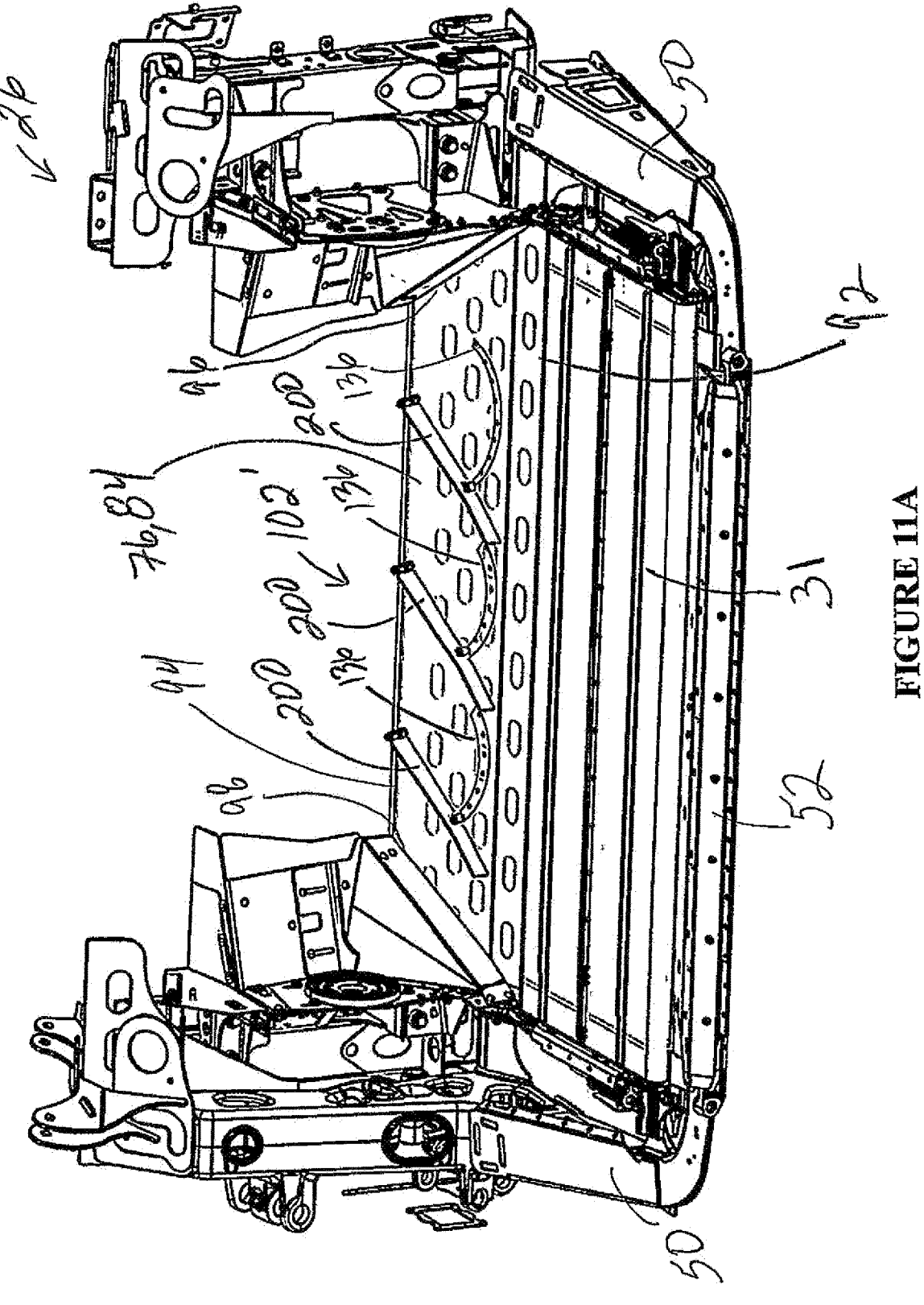
FIGS. 11A-11C illustrate a portion of the draper center section shown in FIG. 3 and including the adjustable divider system with another embodiment of the dividers at various angular orientations.
Figures 11B, 11C:
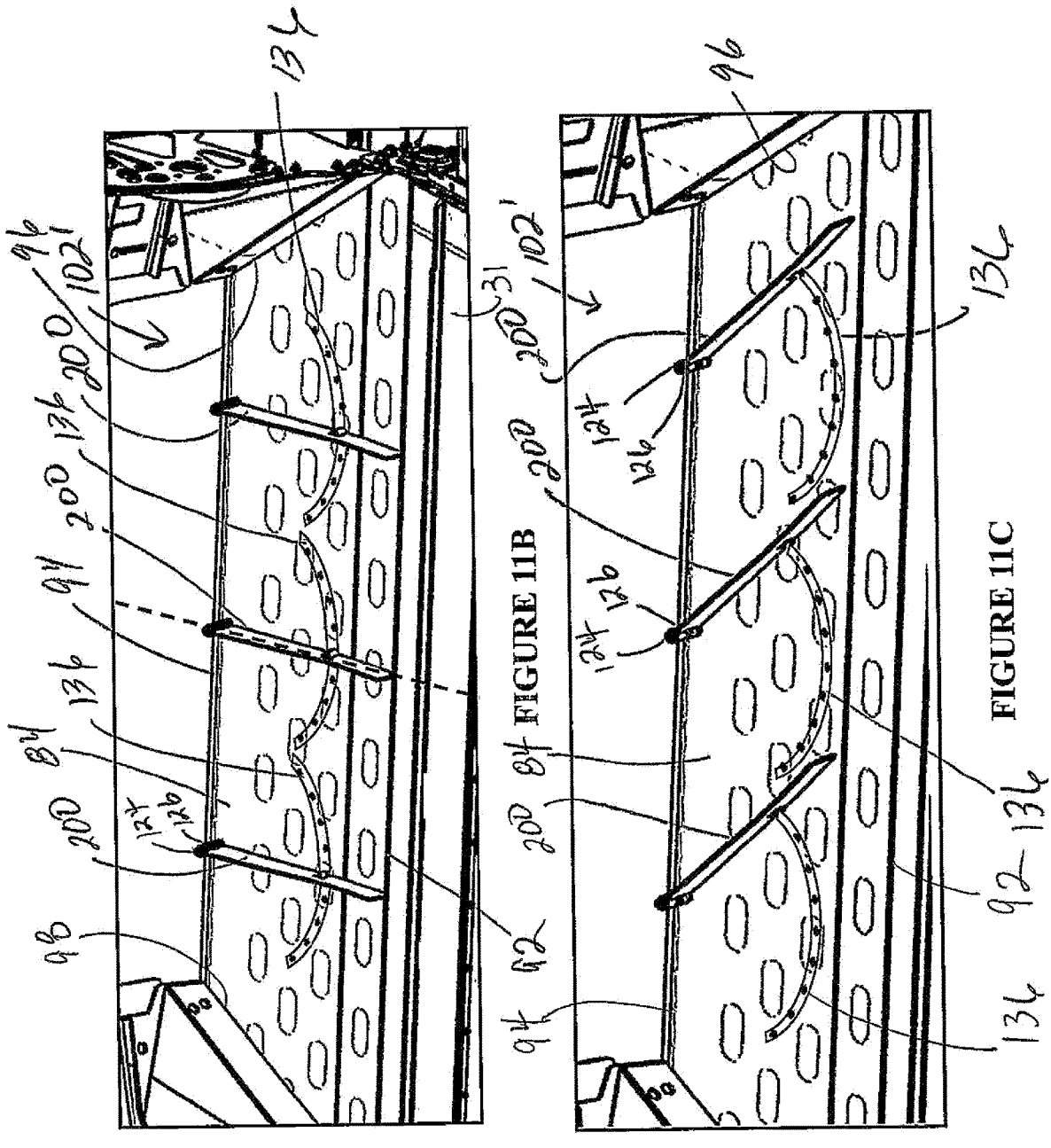
Figures 12A, 12B:
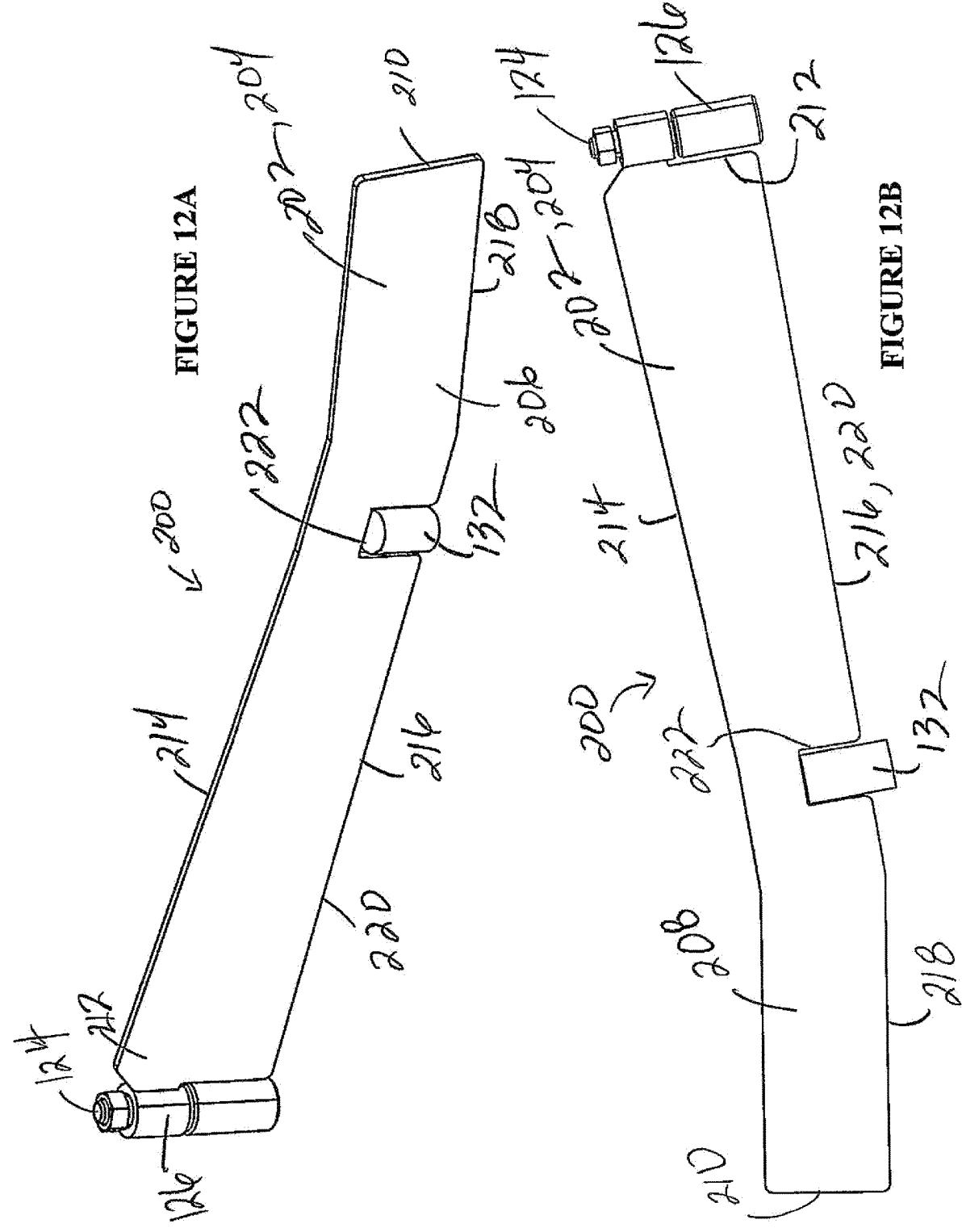
FIGS. 12A and 12B illustrate exemplary embodiments of the dividers shown in FIGS. 11A-11C.

FIGS. 11A-11C illustrate a portion of the draper center section 26 shown in FIG. 3 and including another embodiment of dividers or vanes 200 for the adjustable divider system 100' at various angular orientations, namely a first position, a center position, and a second position. Additionally, FIGS. 12A and 12B illustrate exemplary embodiments of the dividers 200 shown in FIGS. 11A-11C. The adjustable divider system 100' illustrated in FIGS. 11A-11C can be similar to the embodiments discussed above with respect to at least FIGS. 4A-9 but can also utilize dividers 200 having the illustrated configuration, among other divider configurations. As seen, the dividers 200 can include a divider wall 202 having a single sidewall 204 that includes a first side 206 and a second side 208 and can extend from opposing first and second ends 210, 212 of the divider wall 202. A height of the divider 200 between a top portion 214 and a wall edge 216 can be sized to prevent and/or minimize contact of the divider 200 with tines 91 of the feed drum 80.

A wall edge 216 of the divider wall 202 can have a first, leading portion 218 and a second, trailing portion 220 can have configurations similar to those discussed above with respect to the first, leading portion 120 and second, trailing portion 122 shown in at least FIG. 5A. Further, the divider 200 can be mounted to, and/or include, a pivot housing 126 or pivot body 124 that is similar to the pivot housing 126 or pivot body 124 arrangements discussed above with respect to the divider 102 shown in at least FIG. 5A. Additionally, the sidewall 204 can include a notch or recess 222 to which the guide protrusion 132 can be placed and/or secured, the guide protrusion 136 extending below the wall edge 216 so as to be matingly received by the guide aperture 136. The guide protrusion 136 can be secured within the notch 222 in a variety of manners, including, for example, via one or more welds.

Figure 13A:
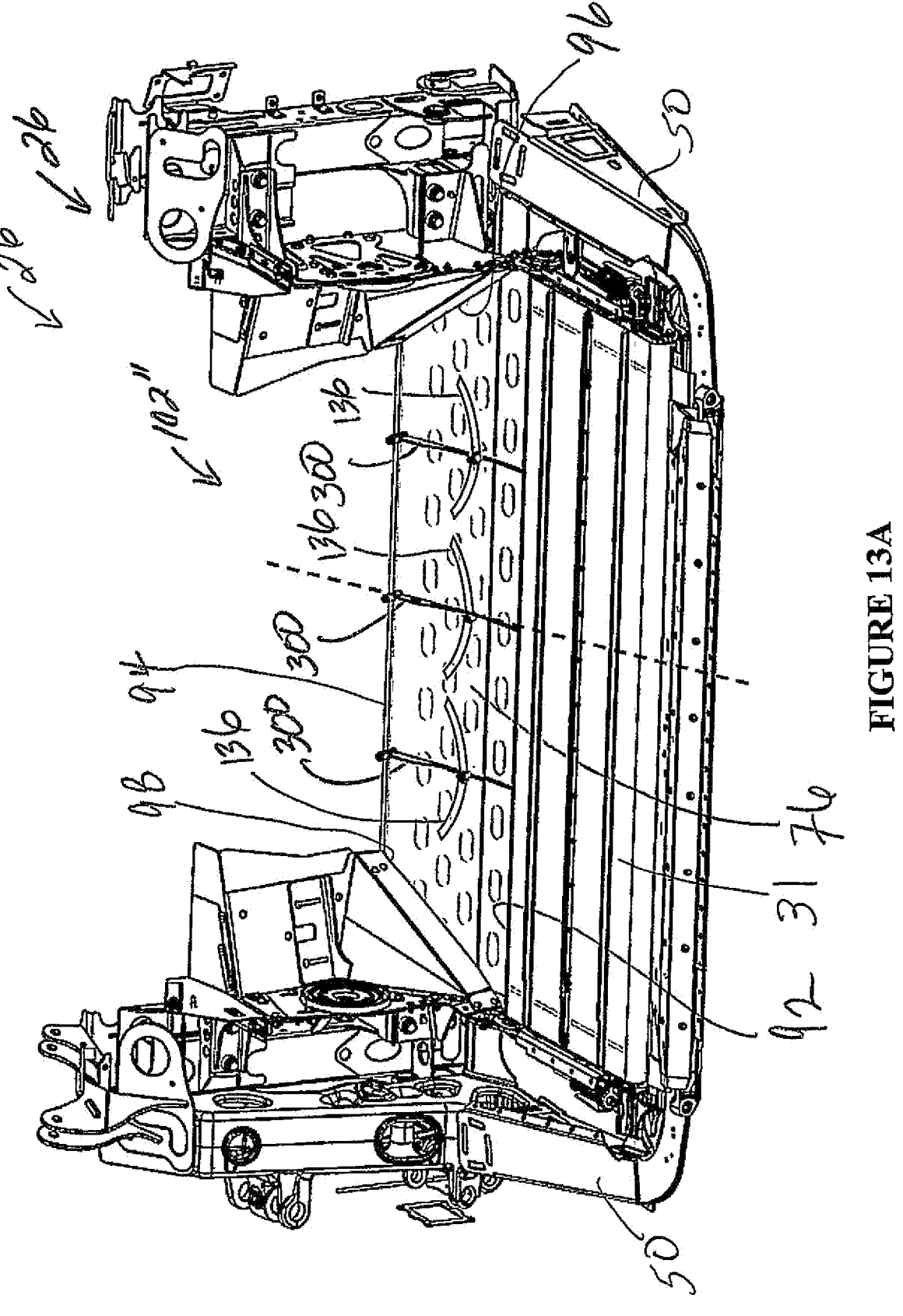
FIGS. 13A-13C illustrate a portion of the draper center section shown in FIG. 3 and including the adjustable divider system with another embodiment of the dividers at various angular orientations.
Figures 13B, 13C:
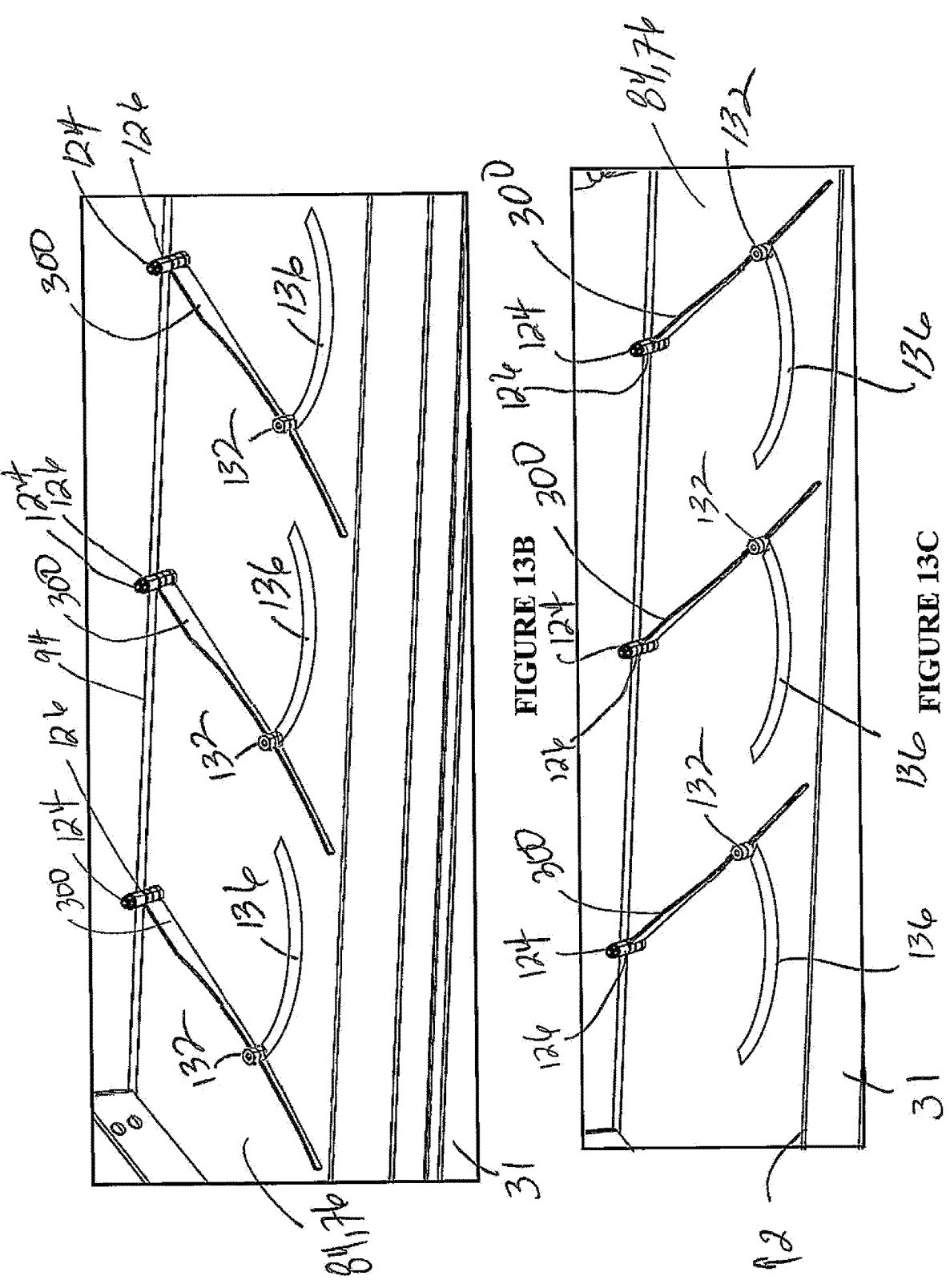
Figures 14A, 14B:
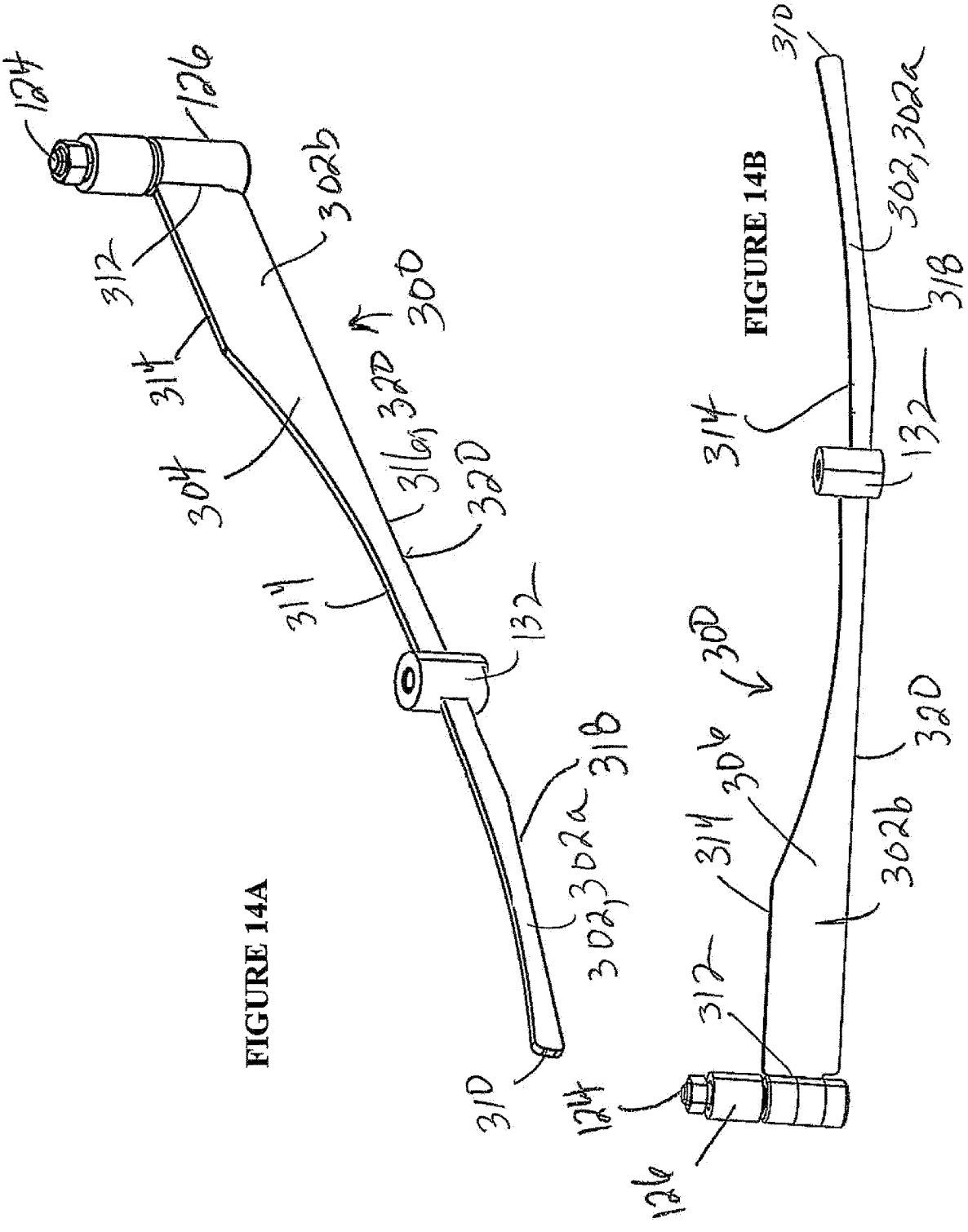
FIGS. 14A and 14B illustrate exemplary embodiments of the dividers shown in FIGS. 13A-13C.

FIGS. 13A-13C illustrate a portion of the draper center section 26 shown in FIG. 3 and including another embodiment of dividers or vanes 300 for the adjustable divider system 100" at various angular orientations, namely a first position, a center position, and a second position. Additionally, FIGS. 14A and 14B illustrate exemplary embodiments of the dividers 300 shown in FIGS. 13A-13C. The adjustable divider system 100" illustrated in FIGS. 13A-13C can also be similar to the embodiments discussed above with respect to at least FIGS. 4A-9, but can utilize dividers 300 having the illustrated configuration, among other divider configurations. As seen, the dividers 300 can include a divider wall 302 having a first wall segment 302a and a second wall segment 302b, the first and second wall segments 302a, 302b each being connected to, and extending from opposing sides of, the guide protrusion 132. Thus, first wall segment 302a can extend from a first end 310 of the divider 300 to the guide protrusion 132, and the second wall segment 302b can extend from the guide protrusion 132 to the second end 312 of the divider wall 302. The guide protrusion 136 can be secured within the first and second wall segments 302a, 302b in a variety of manners, including, for example, via one or more welds. Additionally, the divider wall 302 can include opposing first and second sides 304, 306.

A height of the divider 300 between a top portion 314 and a wall edge 316 for each of the first and second wall segments 302a, 302b can be sized to prevent and/or minimize contact of the divider 300 with tines 91 of the feed drum 80. As seen, at least a portion of the top portion 314 can have a curvature or radius that is similar to, or larger than a curvature radius of the feed drum 80. The curved portion which is seen extending along at least a portion of the top portion of the first and second segments 302a, 302b can be sized so as to mate the size of the feed drum 80 in a manner that can assist placement of those portions of the divider 300 beneath the feed drum 80 in a manner that minimizes or prevents contact with the feed drum 80.

A wall edge 316 of the sidewall 302 of the divider wall 302 can include a first, leading portion 318, which can be positioned along the first wall segment 302a, and a second, trailing portion 320, which can be positioned along a portion of the first wall segment 302a as well as extend along the second wall segment 302. Again, the first, leading portion 318 and a second, trailing portion 320 can have configurations that are similar to those discussed above with respect to the first, leading portion 120 and second, trailing portion 122 shown in at least FIG. 5A.

The divider 300 can also be mounted to, and/or include, a pivot housing 126 or pivot body 124 that is similar to the pivot housing 126 or pivot body 124 arrangements discussed above with respect to the divider 102 shown in at least FIG. 5A.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

The invention claimed is:

1. An adjustable divider system adapted to assist in distributing a crop material being discharged from a draper header to a feederhouse, the adjustable divider system comprising:

at least one divider positioned adjacent to an upper side of a drum floor;

at least one actuator coupled to the at least one divider;

a controller coupled to the at least one actuator and adapted to selectively operate the at least one actuator; and at least one sensor adapted to provide information to the controller indicative of a distribution of the crop material, wherein, using at least the information from the at least one sensor, the controller generates a signal to selectively operate the at least one actuator, at least one divider being pivotally displaceable about the drum floor in response to the selective operation of the at least one actuator, wherein the at least one divider includes a divider wall having a notch positioned between a first end and a second end of a divider wall, the notch sized to received placement of a guide protrusion that is configured for sliding engagement within at least a portion of a guide aperture in the drum floor.

2. An adjustable divider system adapted to assist in distributing a crop material being discharged from a draper header to a feederhouse, the adjustable divider system comprising:

at least one divider positioned adjacent to an upper side of a drum floor;

at least one actuator coupled to the at least one divider;

a controller coupled to the at least one actuator and adapted to selectively operate the at least one actuator; and at least one sensor adapted to provide information to the controller indicative of a distribution of the crop material, wherein, using at least the information from the at least one sensor, the controller generates a signal to selectively operate the at least one actuator, at least one divider being pivotally displaceable about the drum floor in response to the selective operation of the at least one actuator, wherein the at least one divider includes a divider wall having a first wall segment and a second wall segment, the first and second wall segments being separate segments of the divider wall that are joined together at a guide protrusion that is configured for sliding engagement within at least a portion of a guide aperture in the drum floor.

3. A method of operating an adjustable divider system to assist in distributing a crop material, the method comprising:

detecting, by one or more sensors of an agricultural machine, one or more distribution characteristics of the crop material;

determining, using the one or more distribution characteristics, a crop material distribution at one or more locations along at least a portion the agricultural machine;

pivotally displacing, in response to the determined crop material distribution, one or more dividers relative to a drum floor of a draper header to adjust a distribution of the crop material entering into a feederhouse of the agricultural machine; and guiding, via a mating engagement of a guide protrusion of the one or more dividers and one or more guide apertures in the drum floor, the pivotal displacement of the one or more dividers.

4. The method of claim 3, wherein determining the crop material distribution comprises predicting the crop material distribution using one or more distribution characteristics that is attained from a location upstream of a center draper section of the draper header.

5. The method of claim 3, wherein determining the crop material distribution comprises a real-time determination of the distribution characteristics at a center draper section of the draper header.

6. The method of claim 3, wherein determining the crop material distribution comprises a determination of the distribution characteristics at a location downstream of the draper header.

7. The method of claim 3, wherein pivotally displacing the one or more dividers comprises selectively activating one or more actuators that are coupled to the one or more dividers.

8. The method of claim 7, wherein the one or more dividers comprises a plurality of dividers and the one or more actuators comprises a plurality of actuators, and wherein pivotally displacing comprises displacing one of the plurality of dividers to an angular orientation that is different than an angular orientation of at least another divider of the plurality of dividers.

9. An adjustable divider system adapted to assist in distributing a crop material being discharged from a draper header to a feederhouse, the adjustable divider system comprising:

at least one divider positioned adjacent to an upper side of a drum floor, the at least one divider including a guide protrusion sized to be matingly received in a least a portion of one or more guide apertures in the drum floor;

at least one actuator coupled to the at least one divider;

a controller coupled to the at least one actuator and adapted to selectively operate the at least one actuator; and at least one sensor adapted to provide information to the controller indicative of a distribution of the crop material, wherein, using at least the information from the at least one sensor, the controller generates a signal to selectively operate the at least one actuator, at least one divider being pivotally displaceable about the drum floor in response to the selective operation of the at least one actuator.

10. The adjustable divider system of claim 9, further including a linkage system coupled to the at least one actuator and to the at least one divider, wherein the linkage system transmits a force from the at least one actuator to the at least one divider, and wherein the at least one actuator comprises a single actuator.

11. The adjustable divider system of claim 9, wherein the at least one actuator includes a plurality of actuators, and the at least one divider includes a plurality of dividers, each actuator of the plurality of actuators coupled to one divider of the plurality of dividers.

12. The adjustable divider system of claim 11, wherein each divider of the plurality of dividers is pivotally displaceable independent of pivotal displacement of at least another divider of the plurality of dividers.

13. The adjustable divider system of claim 9, wherein the at least one sensor includes one or more sensors that detects a quantity or weight of crop material along one or more positions on the draper header.

14. The adjustable divider system of claim 9, wherein the at least one sensor includes one or more sensors that detects an incline or a tilt of at least a portion of the draper header.

15. The adjustable divider system of claim 9, wherein the at least one sensor includes one or more sensors that detects a quantity of a crop that is adjacent to different portions of the draper header.

16. The adjustable divider system of claim 9, wherein the at least one sensor includes one or more sensors that detects a distribution of at least one of a collected crop or a crop residue downstream of the draper header.

17. The adjustable divider system of claim 9, wherein the at least one divider includes a divider wall having a first sidewall and a second sidewall, the first and second sidewalls extending downwardly and outwardly from a wall apex of the divider wall.

18. The adjustable divider system of claim 17, wherein each of the first sidewall and the second sidewall include an edge wall, and wherein the edge wall either (1) includes a wear edge comprising a material that is different than a material of the first and second sidewalls, or (2) has a material hardness that is different than a material hardness of the first sidewall and the second sidewall.

\*    \*    \*    \*    \*